United States Patent
Carbone et al.

(10) Patent No.: US 12,391,225 B2
(45) Date of Patent: Aug. 19, 2025

(54) METHOD FOR CONTROLLING A BRAKING SYSTEM WITH B-b-W TECHNOLOGY FOR THE DISTRIBUTION OF BRAKING FORCES FOR PARKING A VEHICLE AND SYSTEM THEREOF

(71) Applicant: BREMBO S.p.A., Curno (IT)

(72) Inventors: Fabio Carbone, Curno (IT); Davide Isgro', Curno (IT)

(73) Assignee: Brembo S.p.A., Bergamo (IT)

( * ) Notice: Subject to any disclaimer, the term of this patent is extended or adjusted under 35 U.S.C. 154(b) by 337 days.

(21) Appl. No.: 18/249,070

(22) PCT Filed: Oct. 12, 2021

(86) PCT No.: PCT/IB2021/059327
§ 371 (c)(1),
(2) Date: Apr. 14, 2023

(87) PCT Pub. No.: WO2022/079583
PCT Pub. Date: Apr. 21, 2022

(65) Prior Publication Data
US 2023/0391302 A1  Dec. 7, 2023

(30) Foreign Application Priority Data
Oct. 16, 2020 (IT) ................. 102020000024442

(51) Int. Cl.
*B60T 8/1766* (2006.01)
*B60T 8/171* (2006.01)
(Continued)

(52) U.S. Cl.
CPC ............ *B60T 8/1766* (2013.01); *B60T 8/171* (2013.01); *B60T 8/172* (2013.01); *B60T 8/30* (2013.01);
(Continued)

(58) Field of Classification Search
CPC ........ B60T 8/1766; B60T 8/171; B60T 8/172; B60T 8/30; B60T 8/885; B60T 17/22;
(Continued)

(56) References Cited

U.S. PATENT DOCUMENTS 5,474,369 A * 12/1995 Inagaki .................. B60T 8/326
                                                                    303/3
5,711,585 A *  1/1998 Tozu ...................... B60T 8/268
                                                                    303/146
(Continued)

FOREIGN PATENT DOCUMENTS

DE         19836017 A1     2/2000
DE     102007030780 A1     1/2009
(Continued)

OTHER PUBLICATIONS

European Patent Office, International Search Report, issued in PCT/IB2021/059327, Jan. 25, 2022, Rijswijk, NL.

*Primary Examiner* — Kurt Philip Liethen
(74) *Attorney, Agent, or Firm* — Marshall & Melhorn, LLC

(57) ABSTRACT

A method for controlling a braking system of a vehicle for the distribution of braking forces for parking the vehicle involves receiving, by a system for controlling the braking system, a first piece of information representative of a first working temperature of a first vehicle front axle, a second piece of information representative of a second working temperature of a second vehicle rear axle, a third piece of information representative of a gradient of the vehicle, a fourth piece of information representative of a coefficient of friction between the vehicle and a road, and a fifth piece of information representative of a weight of the vehicle, and determining a first target braking force to be applied to the first front axle and a second target braking force to be
(Continued)

applied to the second rear axle based on the first, second, third, fourth and fifth pieces of information.

18 Claims, 9 Drawing Sheets

(51) Int. Cl.
  *B60T 8/172* (2006.01)
  *B60T 8/30* (2006.01)
  *B60T 8/88* (2006.01)
  *B60T 17/22* (2006.01)
(52) U.S. Cl.
  CPC .............. *B60T 8/885* (2013.01); *B60T 17/22* (2013.01); *B60T 2201/06* (2013.01); *B60T 2210/12* (2013.01); *B60T 2210/20* (2013.01); *B60T 2250/00* (2013.01); *B60T 2250/02* (2013.01); *B60T 2270/10* (2013.01); *B60T 2270/413* (2013.01); *B60T 2270/82* (2013.01)
(58) Field of Classification Search
  CPC .............. B60T 2201/06; B60T 2210/12; B60T 2210/20; B60T 2250/00; B60T 2250/02; B60T 2270/10; B60T 2270/413; B60T 2270/82; B60Y 2400/81
  See application file for complete search history.

(56) References Cited

U.S. PATENT DOCUMENTS

| | | | |
|---|---|---|---|
| 6,256,570 B1 * | 7/2001 | Weiberle | B60T 13/74 188/170 |
| 6,349,995 B1 * | 2/2002 | Itoh | B60T 13/662 303/116.1 |
| 10,272,913 B2 * | 4/2019 | Boisvert | B60L 58/12 |
| 2002/0167221 A1 * | 11/2002 | Kosik | B60W 20/13 903/947 |
| 2006/0113833 A1 * | 6/2006 | Lingman | B60T 8/24 188/106 P |
| 2009/0195058 A1 | 8/2009 | Jackson et al. | |
| 2009/0198427 A1 * | 8/2009 | Christopher Jackson | B60T 13/662 188/1.11 R |
| 2010/0235065 A1 * | 9/2010 | Logan | B60T 17/22 701/80 |
| 2010/0241304 A1 * | 9/2010 | Maeda | B60W 10/08 701/31.4 |
| 2011/0181224 A1 * | 7/2011 | Baehrle-Miller | B60T 7/085 318/490 |
| 2014/0343767 A1 * | 11/2014 | Oswald | B60T 8/1705 701/19 |
| 2015/0217748 A1 * | 8/2015 | Chico | B60T 8/1703 701/3 |
| 2019/0031162 A1 * | 1/2019 | Besier | B60T 8/176 |
| 2019/0077500 A1 * | 3/2019 | Kipp | B60T 8/171 |
| 2019/0248354 A1 * | 8/2019 | Andrea | B60T 13/741 |
| 2019/0359196 A1 * | 11/2019 | Engelbert | B60T 17/22 |
| 2021/0197778 A1 * | 7/2021 | Shi | B60T 8/1761 |
| 2022/0017049 A1 * | 1/2022 | Forni | B60T 13/662 |
| 2023/0303043 A1 * | 9/2023 | Forni | B60T 8/17616 |
| 2024/0383340 A1 * | 11/2024 | Carbone | B60L 3/108 |

FOREIGN PATENT DOCUMENTS

| | | |
|---|---|---|
| DE | 102008032544 A1 | 2/2009 |
| WO | 2005042320 A1 | 5/2005 |

* cited by examiner

| ST-1 { | | |
|---|---|---|
| T-S (°C) | P-D (%) | P-S (%) |
| -20 | -46 | 34 |
| 20 | -38 | 33 |
| 85 | -22 | 22 |

Fig. 9

METHOD FOR CONTROLLING A BRAKING SYSTEM WITH B-b-W TECHNOLOGY FOR THE DISTRIBUTION OF BRAKING FORCES FOR PARKING A VEHICLE AND SYSTEM THEREOF

FIELD

The present invention relates to a braking system of a vehicle, in particular to a method for controlling a braking system with B-b-W technology for the distribution of parking braking forces of a vehicle and a system thereof.

BACKGROUND

A traditional braking system with B-b-W ("Brake-by-Wire") technology, in which, for example, the braking action of a brake caliper on a wheel is obtained by centralized actuation through the use of an electro-hydraulic "master cylinder" actuator, performs the function of holding the parking force, during parking maneuvers of the vehicle with the driver on-board, through the activation of electro-valves, the main function of which, during service braking, is to regulate the pressure in case of wheel slip.

In a braking system with B-b-W technology and independent axle architecture (in which one or more actuators are distributed for each axle of the vehicle), in which no electro-valves are provided and the pressure adjustment function in case of vehicle wheel slip is performed by the electro-hydraulic or electro-mechanical system, the holding of the parking force is delegated to the electro-hydraulic or electro-mechanical actuators themselves.

Therefore, in addition to performing the function of service braking of the vehicle, such electro-hydraulic or electro-mechanical actuators can be used to park the vehicle in all cases in which it is not preferable to use the parking brake for reasons of comfort and driveability.

In this regard, the availability and the ability of an electro-hydraulic or electro-mechanical actuator to hold the force necessary to park the vehicle without incurring damage, greatly depend on the system working temperature, i.e., the current temperature of the electric motor adapted to convert electrical energy into mechanical energy, thus adapted to actuate the mechanism of the electro-hydraulic or electro-mechanical actuator.

Indeed, the current temperature of the electric motor influences the ability to implement the parking force of the vehicle, and also the maximum time limit for which it can be held without incurring internal damage to the electric motor.

For example, the electric current flowing inside the electric motor can cause the temperature of the electric motor to rise, which can result in possible damage to the materials of the electric motor itself.

By way of example, FIG. 1 shows the dependence of the torque T-Q which an electric motor can deliver continuously without incurring damage, as a function of the system working temperature T-S, i.e., the internal temperature of the electric motor at the starting instant of torque application.

The continuous force limits of an electric motor actuating an electro-mechanical or electro-hydraulic actuator in a braking system with B-b-W technology and independent axle architecture (e.g., Cf. FIG. 1) and the possible braking force distributions on the independent axles for parking a vehicle, in turn, limit the maximum permissible vehicle gradient values for a reliable vehicle parking function in the system working temperature range, i.e., the current working temperatures of an electric motor adapted to actuate the respective electro-hydraulic or electro-mechanical actuator.

Again, by way of example, FIG. 2 shows a table comparing the maximum gradients of a vehicle with independent axles for reliable parking as a function of the system working temperature values, according to the prior art.

The table in FIG. 2 shows the following data from left to right:

- the system working temperature values TS in the first column;
- the permissible downhill gradient values P-D and uphill gradient values P-S for a first parking ST-1 of a vehicle by distributing braking forces only on a first axle F-A of the vehicle (e.g., the front axle) in the second and third columns, respectively;
- the permissible downhill gradient values P-D and uphill gradient values P-S for a second parking ST-2 of the vehicle by distributing braking forces only on a second axle R-A of the vehicle (e.g., the rear axle) in the fourth and third columns, respectively;
- the permissible downhill gradient values P-D and uphill gradient values P-D for a third parking ST-3 of a vehicle by distributing braking forces on the first axle F-A and the second axle R-A of the vehicle (front axle and rear axle) in the sixth and seventh columns, respectively.

To increase the performance of a braking system more and more, the need is strongly felt to have a braking system with B-b-W technology of a vehicle which guarantees a braking force distribution for parking the vehicle such to offer greater operability in terms of the maximum parking gradient of the vehicle within the working temperature range of the electric motor adapted to actuate the respective electro-hydraulic or electro-mechanical actuator to impart the braking of the vehicle.

SUMMARY

It is an object of the present invention to devise and provide a method of controlling a braking system for the distribution of braking forces for parking a vehicle which allows to obviate at least partially the drawbacks complained hereto with reference to the prior art, and in particular which ensures an improved performance of the braking system, in particular by increasing its operability in terms of the maximum permissible vehicle parking gradient within the working temperature range of the braking system.

Such an object is achieved by a method as described and claimed herein.

It is a further object of the present invention to provide a system for controlling a braking system for the distribution of braking forces for parking the vehicle.

Further advantageous embodiments are the object of the dependent claims.

DESCRIPTION OF THE FIGURES

Further features and advantages of the method and system according to the invention will be apparent from the following description of preferred embodiments, given by way of indicative, non-limiting examples, with reference to the accompanying figures, in which:

Figure 9:
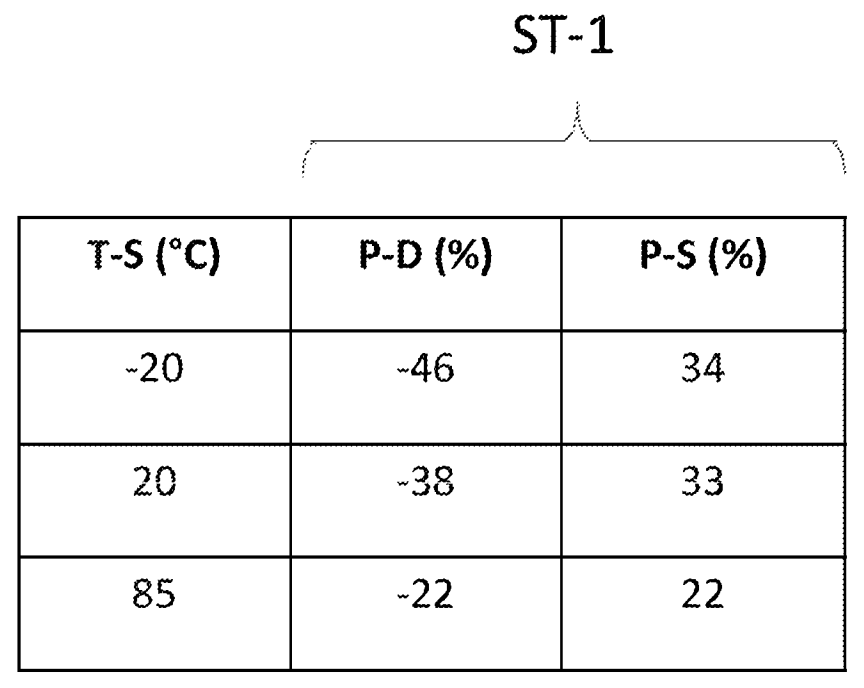

FIG. 9 shows, by means of a table, the maximum gradients of a vehicle with independent axles for parking the vehicle as a function of the system working temperature values, according to the method and system thereof of the present invention.

It is worth noting that equal or similar elements in the figures will be indicated by the same numeric or alphanumeric references.

DETAILED DESCRIPTION

Figure 1:
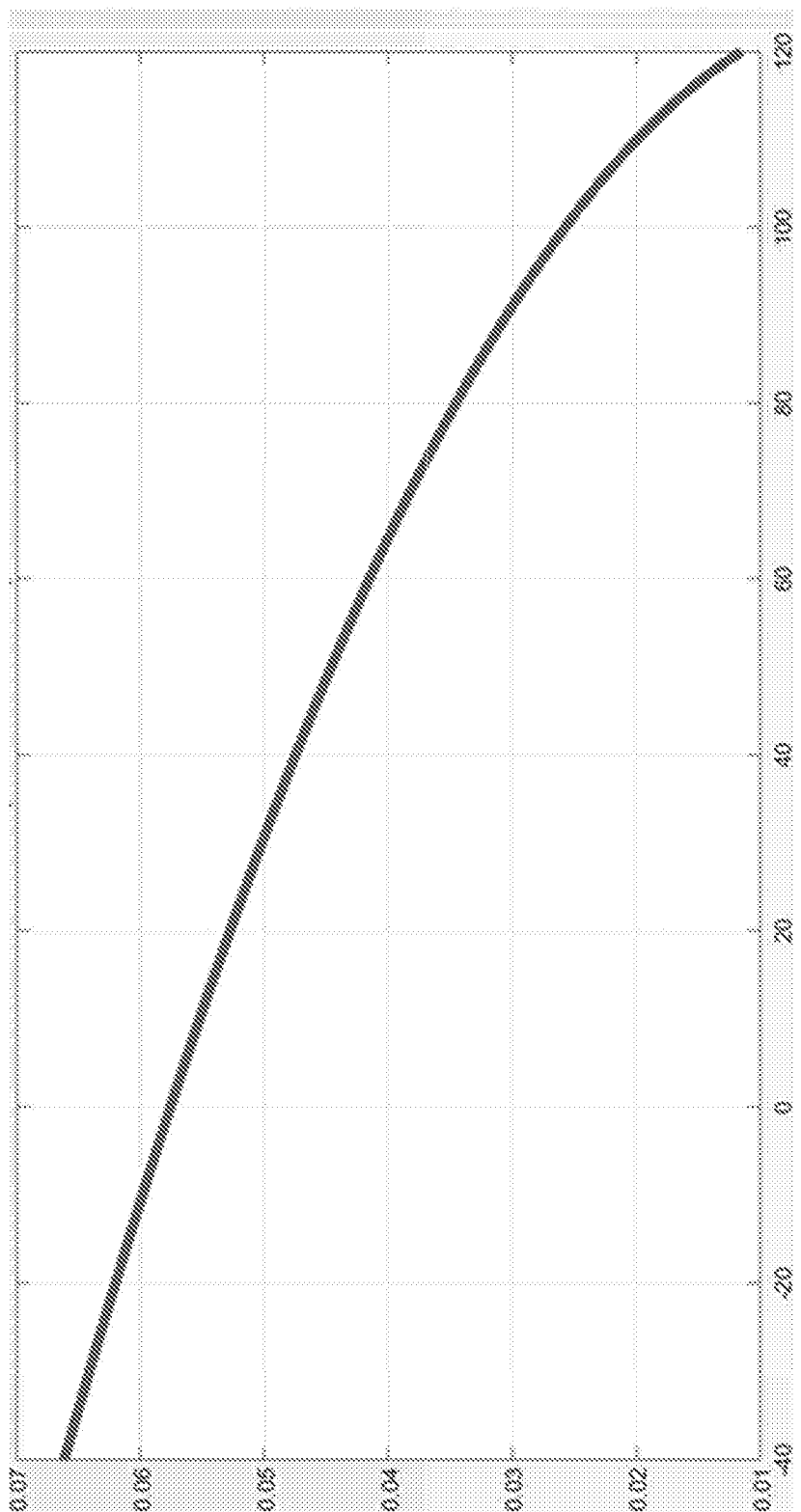
FIG. 1 shows, by means of a graph, the dependence of the continuous torque which can be delivered by an electric motor adapted to actuate the respective electro-hydraulic or electro-mechanical actuator in a braking system with Brake-by-Wire technology as a function of the system working temperature.

With reference now to the aforesaid figures, reference numeral 100 indicates as a whole a system for controlling a braking system for the distribution of braking forces for parking a vehicle, hereinafter also simply control system or only system, according to the present invention.

For the purposes of the present description, "vehicle" means any vehicle or motorcycle, also of commercial type, having two, three, four, or more wheels.

Furthermore, "braking system" means the whole of all the components (mechanical and/or electric or electronic, also the brake fluid) which contribute to generating the service braking of a vehicle or to generating the parking braking of a vehicle.

Referring to FIGS. 3, 4, 5 and 6, the vehicle 1 comprises a first front axle F-A to which a first front wheel W-A1 and a second front wheel W-A2 are connected.

For example, the first front wheel W-A1 is the left front wheel and the second front wheel W-A2 is the right front wheel.

Furthermore, the vehicle 1 comprises a second rear axle R-A to which a first rear wheel W-R1 and a second rear wheel W-R2 are connected.

For example, the first rear wheel W-R1 is the left rear wheel while the second rear wheel W-R2 is the right rear wheel.

The vehicle 1 further comprises a braking system 2.

The braking system 2, in which the system 100 can be used, is an architecture with Brake-by-Wire (B-b-W) technology.

The braking system 2 comprises at least one first actuator module 3 operatively connected to the first front axle F-A.

The braking system 2 further comprises at least one second actuator module 4 operatively connected to the second rear axle R-A.

Each actuator module comprises one or more actuators for each wheel per axle, each comprising a respective electric motor.

Each actuator, controlled by the respective electric motor, is adapted to implement a braking command based on the control received from a respective actuator control module.

Each actuator control module is, e.g., a hardware module or software logic module in a main hardware module of the braking system or more in general of the vehicle 1.

Each actuator is either an electro-mechanical type or an electro-hydraulic type.

Figure 3:
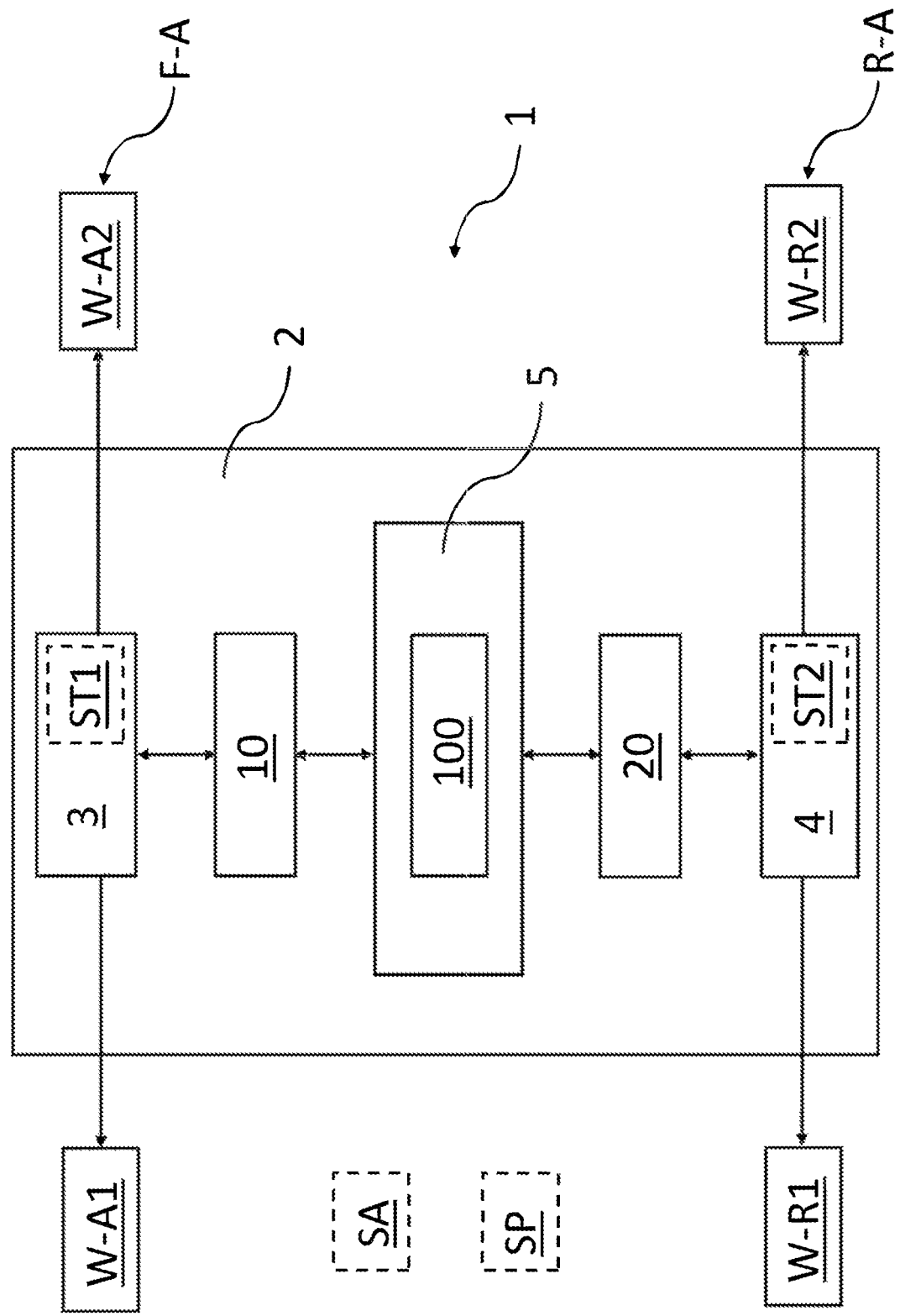
FIG. 3 shows a first example of braking system architecture pf a vehicle employing a system for controlling a braking system for the distribution of braking forces for parking the vehicle according to the present invention.
Figure 5:
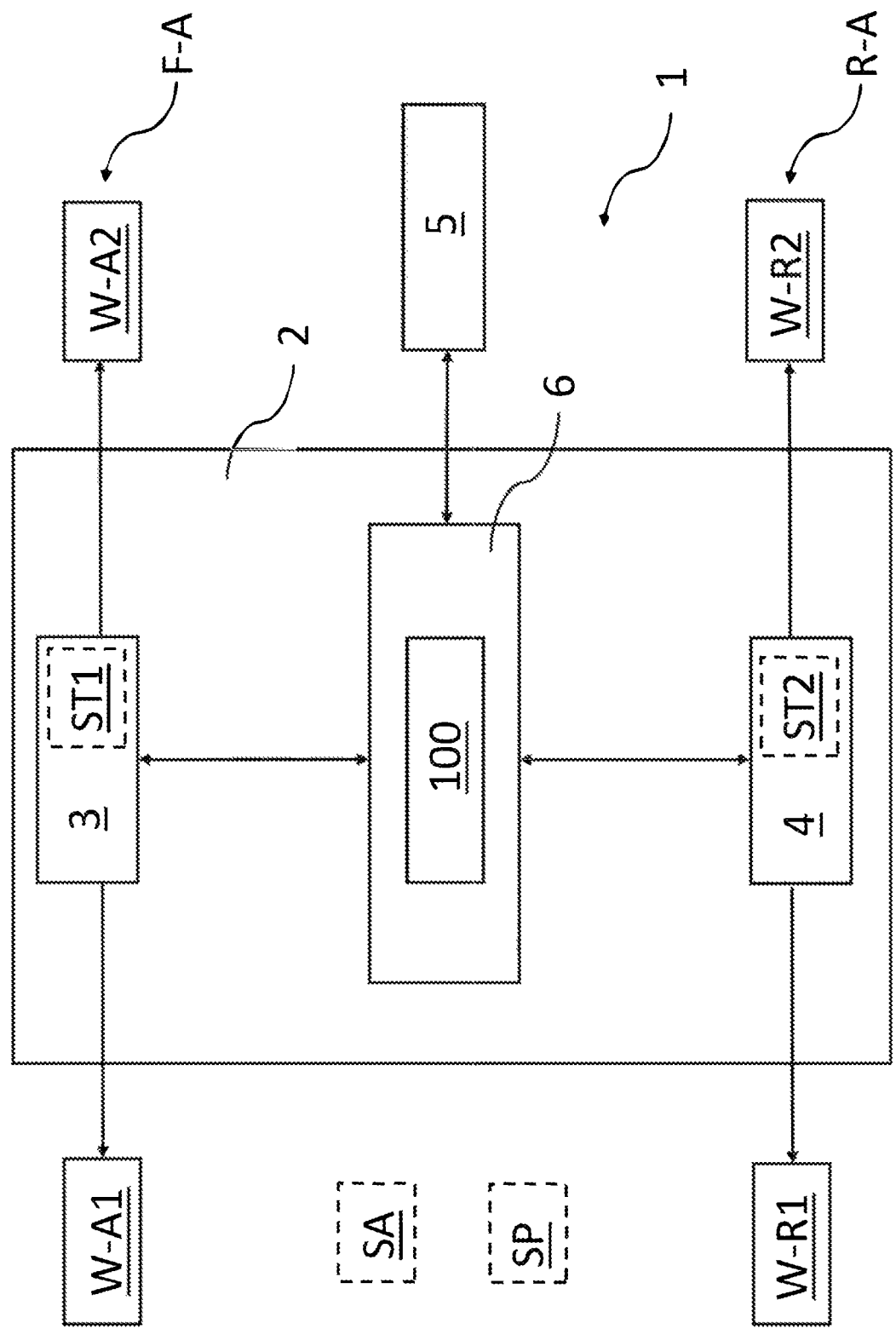
FIG. 5 shows a third example of braking system architecture of a vehicle employing a system for controlling a braking system for the distribution of braking forces for parking the vehicle according to the present invention.

In an embodiment shown in FIG. 3 and FIG. 5, the at least one first actuator module 3 operatively connected to the first front axle F-A is operatively connected to both the first front wheel W-A1 and the second front wheel W-A2.

In this embodiment, the at least one second actuator module 4 operatively connected to the second rear axle R-A is operatively connected to both the first rear wheel W-R1 and a second rear wheel W-R2.

Figure 4:
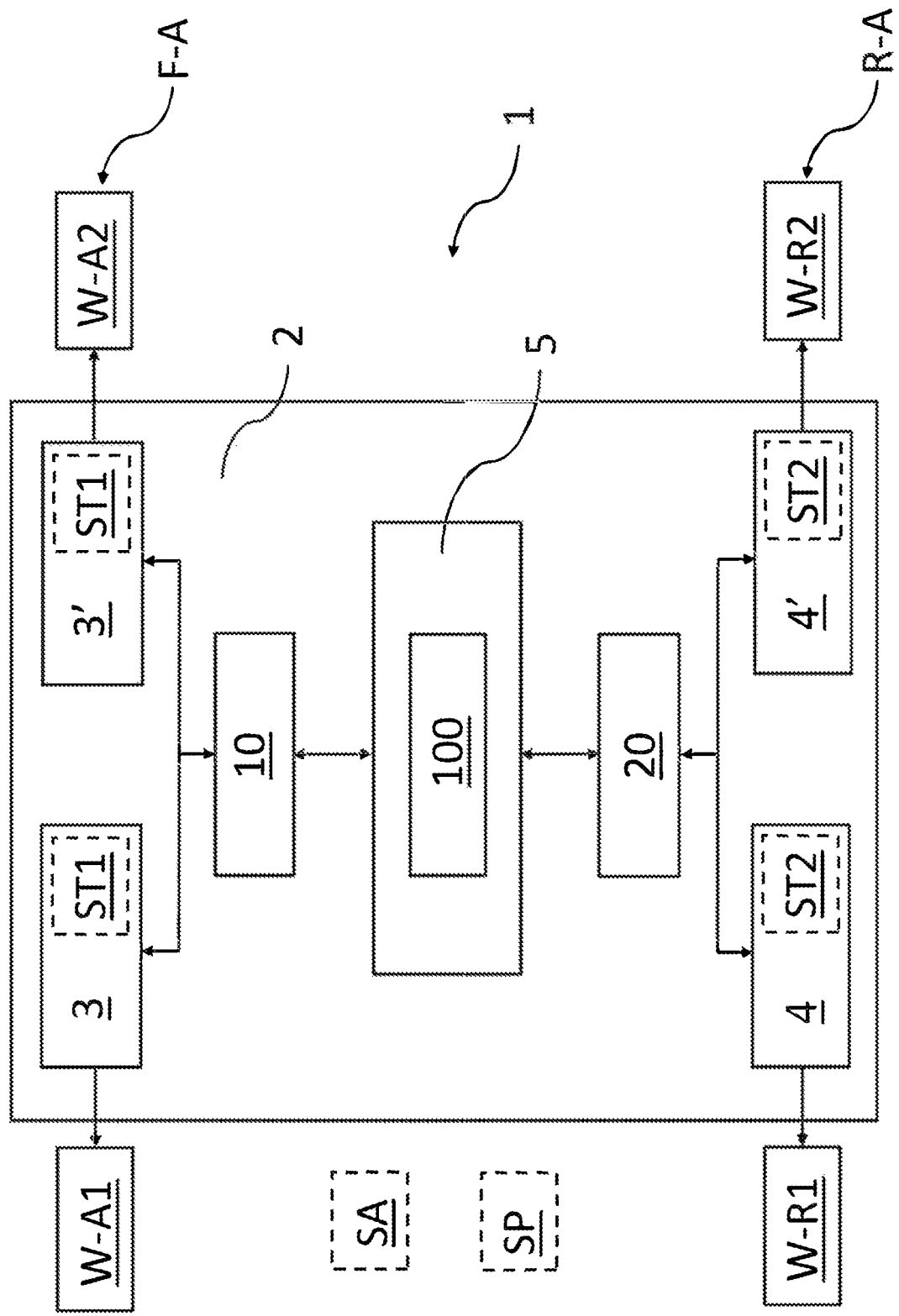
FIG. 4 shows a second example of braking system architecture of a vehicle employing a system for controlling a braking system for the distribution of braking forces for parking the vehicle according to the present invention.
Figure 6:
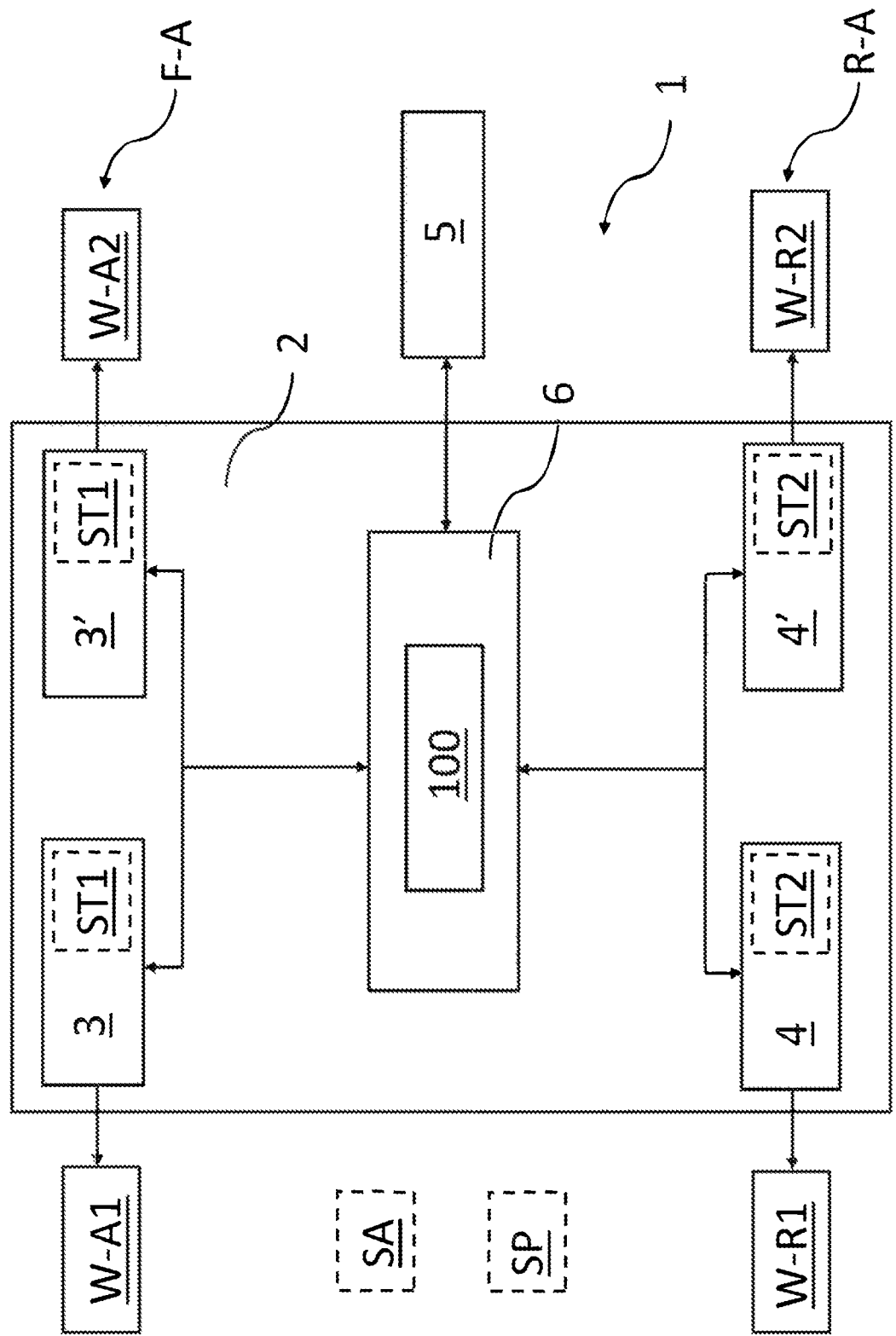
FIG. 6 shows a fourth example of braking system architecture of a vehicle employing a system for controlling a braking system for the distribution of braking forces for parking the vehicle according to the present invention.

In a further embodiment shown in FIG. 4 and FIG. 6, the braking system 2, in addition to the at least one first actuator module 3 operatively connected to the first front axle F-A, further comprises at least one further first actuator module 3' operatively connected to the first front axle F-A.

The at least one first actuator module 3 operatively connected to the first front axle F-A is operatively connected to the first front wheel W-A1 while the at least one further first actuator module 3' operatively connected to the first front axle F-A is operatively connected to the second front wheel W-A2.

In this embodiment, the braking system 2, in addition to the at least one second actuator module 4 operatively connected to the second rear axle R-A, further comprises at least one further second actuator module 4' operatively connected to the second rear axle R-A.

The at least one second actuator module 4 operatively connected to the second rear axle R-A is operatively connected to the first rear wheel W-R1 while the at least one additional second actuator module 4' operatively connected to the second rear axle R-A is operatively connected to the second rear wheel W-A2.

Turning back, in general, to the braking system 2 of FIGS. 3, 4, 5, and 6, the braking system 2 further comprises the system 100 operatively connected to the first actuator module 3 and the second actuator module 4.

In an embodiment, shown in FIG. 3 and FIG. 4, the braking system 2 comprises a first local control unit 10 operatively connected to the first actuator module 3 and the system 100.

The first local control unit 10 is configured to control the first front axle F-A.

Furthermore, in this embodiment, the braking system 2 comprises a second local control unit 20 operatively connected to the second rear axle R-A and the system 100.

The second local control unit 20 is configured to control the second rear axle R-A.

In the embodiment in FIG. 3, the first local control unit 10 is configured to control the at least one first actuator module 3 while the second local control unit 20 is configured to control the at least one second actuator module 4.

In the embodiment in FIG. 4, the first local control unit 10 is configured to control the at least one first actuator module 3 and the at least one further first actuator module 3', while the second local control unit 20 is configured to control the at least one second actuator module 4 and the at least one further second actuator module 4'.

Turning back, in general, to the embodiment of FIGS. 3 and 4, in which the control of the first front axle F-A and the second rear axle R-A is local in that it is delegated to the first local control unit 10 and the second local control unit 20, respectively, the system 100 is comprised in an electronic control unit (ECU) 5 of the vehicle 1, operatively connected to the braking system 2 of the vehicle 1.

In a further embodiment, shown in FIG. 5 and FIG. 6, which is an alternative to the one described with reference to FIG. 3 and FIG. 4, the braking system 2 comprises a central control unit 6 operatively connected to the first front axle F-A and the second rear axle R-A.

The central control unit 6 of the braking system 2 is configured to control the first front axle F-A and the second rear axle R-A.

In the embodiment of FIG. 5, the central control unit 6 of the braking system 2 is operatively connected to the at least one first actuator module 3 operatively connected to the first front axle F-A and the at least one second actuator module 4 operatively connected to the second rear axle R-A.

In the embodiment of FIG. 6, the central control unit 6 of the braking system 2 is operatively connected to the at least one first actuator module 3 operatively connected to the first front axle F-A and the at least one further first actuator module 3' operatively connected to the first front axle F-A.

In this embodiment, the central control unit 6 of the braking system 2 is operatively connected to the at least one second actuator module 4 operatively connected to the second rear axle R-A and the at least one further second actuator module 4' operatively connected to the second rear axle R-A.

Turning back, in general, to the embodiment of FIGS. 5 and 6, the central control unit 6 of the braking system 2 is further operatively connected to an electronic unit (ECU) 5 of the vehicle 1.

In this embodiment, in which the control of the first front axle F-A and the second rear axle R-A is centralized because it is delegated to the central control unit 6, the system 100 is comprised in the central control unit 6 of the braking system 2.

The system 100 will be described in greater detail with reference now also to the diagram in FIG. 7.

The system 100 is configured to receive a first piece of information T-SF representative of a first working temperature of a front axle F-A of the vehicle 1.

The first working temperature of a first front axle F-A of the vehicle 1 is, for example, the temperature of the electric motor adapted to command one of the actuators present in the at least one first actuator module 3 (and the at least one further first actuator module 3', if present).

It is worth noting that the system 100 is configured to receive, as a first information T-SF representative of a first working temperature of a first front axle F-A of the vehicle 1, the greater of the temperatures of the electric motors present in the at least one first actuator module 3 (and the at least one further first actuator module 3', if present) if there are multiple actuators each with a respective electric motor in the at least one first actuator module 3 (and in the at least one further first actuator module 3').

In an embodiment, shown with dashed lines in FIG. 3, the first information T-SF representative of a first working temperature of a first axle F-A of the vehicle 1 is supplied to the system 100 by a first temperature sensor ST1 installed in the respective electric motor of the at least one first actuator module 3 (and of the at least one further first actuator module 3', if present, in which the presence of a further temperature sensor is indicated by the same reference ST1).

In a further embodiment, as an alternative to the preceding one, the first information T-SF representative of a first working temperature of a first axle F-A of the vehicle 1 is calculated as an estimate by a respective control logic (algorithm) with which the first local control unit 10 of the braking system 2 (if the architecture of the braking system 2 is the one according to FIG. 3 and FIG. 4) or the central control unit 5 of the vehicle 1 (if the architecture of the braking system 2 is according to FIG. 5 and FIG. 6) may be equipped, from the software point of view.

In this embodiment, the first information T-SF representative of a first working temperature of a first axle F-A of the vehicle 1 is supplied to the system 100 either as a software variable or as a signal through a communication channel in wired technology.

The system 100 is further configured to receive a second piece of information T-SR representative of a second working temperature of a second axle R-A of the vehicle 1.

The second working temperature of a second rear axle R-A of the vehicle 1 is, for example, the temperature of the electric motor adapted to command one of the actuators present in the at least one second actuator module 4 (and of the at least one further second actuator module 4', if present).

It is worth noting that the system 100 is configured to receive, as second information T-SF representative of a second working temperature of a second rear axle R-A of the vehicle 1, the greater of the temperatures of the electric motors present in the at least one second actuator module 4 (and the at least one further second actuator module 4', if present) if there are multiple actuators each with the respective electric motor in the at least one second actuator module 4 (and in the at least one further second actuator module 4').

In an embodiment, shown with dashed lines in FIG. 3, the second information T-SR representative of a second working temperature of a second axle R-A of the vehicle 1 is supplied to the system 100 by a second temperature sensor ST2 installed in the respective electric motor of the at least one second actuator module 4 (and of the at least one further second actuator module 4', if present, wherein the presence of a further temperature sensor is indicated by the same reference ST2).

In a further embodiment, as an alternative to the preceding one, the second information T-SR representative of a second working temperature of a second axle R-A of the vehicle 1 is calculated as an estimate by a respective control logic (algorithm) with which the second local control unit 20 of the braking system 2 (if the architecture of the braking system 2 is the one according to FIG. 3 and FIG. 4) or the central control unit 5 of the vehicle 1 (if the architecture of the braking system 2 is according to FIG. 5 and FIG. 6) may be equipped, from the software point of view.

In the latter embodiments, the second information T-SR representative of a second working temperature of a second axle R-A of the vehicle 1 is supplied to the system 100 either as a software variable or as a signal through a communication channel in wired technology.

Turning back to FIG. 7, the system 100 is further configured to receive a third piece of information PZ representing a gradient of the vehicle 1.

In an embodiment, as an alternative to the preceding one, the third information PZ representative of a gradient of the vehicle 1 is determined, either as a measure or estimate, by a respective control logic (algorithm) based on a piece of information representative of the acceleration of the vehicle 1 supplied by an acceleration sensor SA (accelerometer) installed either in the central control unit 5 of the vehicle or at the barycenter of the vehicle 1.

From a software point of view, as an alternative embodiment to the preceding one, the control logic adapted to determine, either as a measure or estimate, the third information PZ representative of a gradient of the vehicle 1, based on an information representative of the acceleration of the vehicle 1, is installed in the central control unit 6 of the braking system 2 (FIGS. 5 and 6).

As an alternative embodiment to the preceding one, such control logic, from the software point of view, is installed in the central control unit 5 of the vehicle 1 (FIG. 3, 4, 5, or 6), instead.

In the latter embodiments, the third information PZ representative of a gradient of the vehicle 1 is supplied to the system 100 either as a software variable or as a signal through a communication channel in wired technology.

In a further embodiment, the third information PZ representative of a gradient of the vehicle 1 is supplied to the system 100 by a respective gradient sensor.

Turning back again to FIG. 7, the system 100 is further configured to receive a fourth piece of information AD representative of a coefficient of friction (grip) between the vehicle 1 (in particular, the wheel tires) and the road.

In an embodiment, the fourth information AD representative of a coefficient of friction between the vehicle 1 and the road supplied to the system 100 is calculated as an estimate or calculation by a respective control logic (algorithm).

In an embodiment, such a control logic is present, from the software point of view, in the central control unit 6 of the braking system 2 (FIGS. 3, 4, 6).

In a further embodiment, such a control logic is present, from the software point of view, in the first local control unit 10 and the second local control unit 20 of the braking system 2 (FIGS. 3 and 4).

In this embodiment, the fourth piece of information AD representing a friction coefficient between the vehicle 1 and the road is supplied to the system 100 either as a software variable or as a signal through a communication channel in wired technology.

Turning back to FIG. 7, the system 100 is further configured to receive a fifth piece of information PV representative of a weight of the vehicle 1.

In an embodiment, the fifth piece of information PV representative of a weight of the vehicle 1 is a fixed parameter, e.g., the maximum vehicle weight 1.

In a further embodiment, the fifth piece of information PV representative of a weight of the vehicle 1 is obtained as an estimate from a control logic present, from the software point of view, in the central control unit 6 of the braking system 2 (FIGS. 3, 4, 5, 6).

In a further embodiment, as an alternative to the preceding one, the fifth piece of information PV representative of a weight of the vehicle 1 is obtained as an estimate from a control logic present, from the software point of view, in the first local control unit 10 and the second local control unit 20 of the braking system 2 (FIGS. 3 and 4).

The system 100 is configured to determine a first target braking force $F1_T$ to be applied to the first front axle F-A of the vehicle 1 to obtain the parking and a second target braking force $F2_T$ to be applied to the second rear axle R-A based on the first piece of information T-SF representative of a first working temperature of a first front axle F-A of the vehicle 1, on the second piece of information T-SR representative of a second working temperature of a second axle R-A of the vehicle 1, on the third piece of information PZ representative of a gradient of the vehicle 1, on the fourth piece of information AD representative of a coefficient of friction between the vehicle 1 and the road, on the fifth piece of information PV representative of a weight of the vehicle 1.

Figure 7:
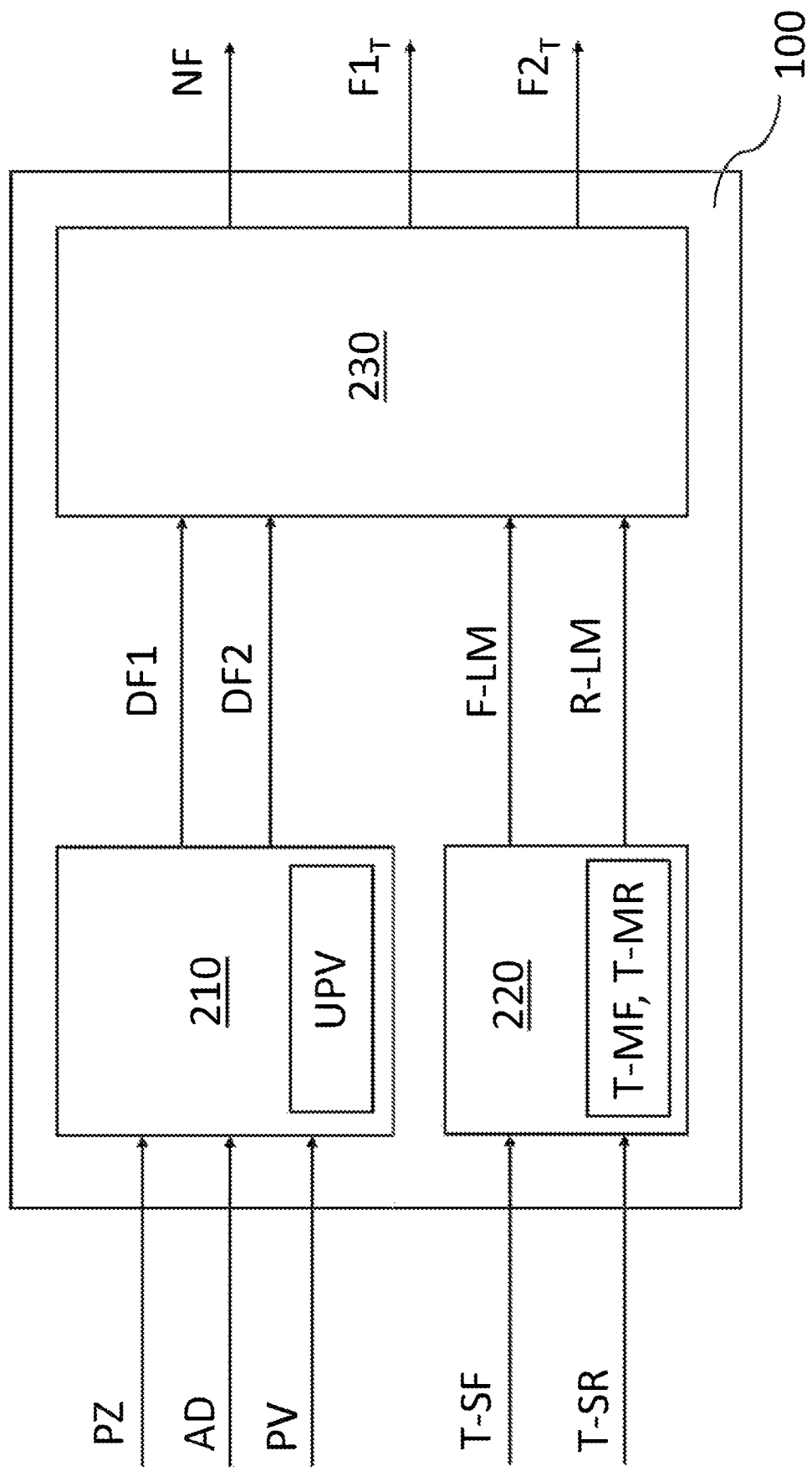
FIG. 7 shows, by means of a block chart, a system for controlling a braking system for the distribution of braking forces for parking the vehicle according to the present invention.

In greater detail, according to an embodiment shown in FIG. 7, the system 100 comprises a first data processing module 210, a second data processing module 220, and a third data processing module 230.

The first data processing module 210 is configured to receive in input the third piece of information PZ representative of the gradient of the vehicle 1, the fourth piece of information AD representative of a coefficient of friction between the vehicle 1 and the road, the fifth piece of information PV representative of a weight of the vehicle 1.

Furthermore, the first data processing module 210 is configured to receive further vehicle parameters UPV, such as:
  g: gravity constant;
  LFA: distance between the first front axle F-A and the barycenter of the vehicle 1;
  LFB: distance between the second rear axle R-A and the barycenter of the vehicle 1;
  CH: height of the barycenter of the vehicle.

The first data processing module 210 is configured to determine, as a function of the third piece of information PZ representative of a gradient of the vehicle 1, the fourth piece of information AD representative of a coefficient of friction between the vehicle 1 and the road, the fifth piece of information PV representative of a weight of the vehicle 1 and the further vehicle parameters UPV:
  a value FW-F representative of the maximum permissible ground force on the first front axle F-A of the vehicle 1 in absence of wheel slip present on the first front axle F-A;
  a value FW-R representative of the maximum permissible ground force on the second rear axle R-A of the vehicle 1 in absence of wheel slip present on the second rear axle R-A;
  a value FL-F representative of a longitudinal force to be applied to the first front axle F-A of the vehicle 1 to obtain parking;
  a value FL-R representative of a longitudinal force to be applied to the second rear axle R-A of the vehicle 1 to obtain parking;
  a first braking force distribution value DF1 to be applied to the first front axle F-A;
  a second braking force distribution value DF2 to be applied to the second rear axle R-A.

In greater detail, the first data processing module 210 is configured to apply the following mathematical relations:

$$W_{tr} = PV \cdot g \cdot \sin PZ \cdot \frac{CH}{LFA + LFB} \cdot AD$$

$$FW-F = PV \cdot g \cdot \frac{FLB}{FLA + FLB} \cdot \cos(PZ) \cdot AD - W_{tr}$$

$$FW-R = PV \cdot g \cdot \frac{FLA}{FLA + FLB} \cdot \cos(PZ) \cdot AD + W_{ty}$$

-continued
$$FL\text{-}F = FW\text{-}F \cdot \tan(PZ)$$
$$FL\text{-}R = FW\text{-}R \cdot \tan(PZ)$$
$$DF1 = FL\text{-}F$$
$$DF2 = FL\text{-}R$$

The first data processing module 210 is configured to assign the value FL-F representative of a longitudinal force to be applied to the first front axle F-A of the vehicle 1 to achieve parking to the first value DF1 of brake force distribution to be applied to the first front axle F-A.

Furthermore, the first data processing module 210 is configured to assign the value FL-R representative of a longitudinal force to be applied to the second rear axle R-A of the vehicle 1 to achieve parking to the second value DF2 of braking force distribution to be applied to the second rear axle F2.

The second data processing module 220 is configured to receive in input the first piece of information T-SF representative of a first working temperature of a first front axle F-A of the vehicle 1 and the second piece of information T-SR representative of a second working temperature of a second axle R-A of the vehicle 1.

The second data processing module 220 is further configured to receive a first maximum working temperature T-MF of the first front axle F-A permissible in absence of damage/reduction of service life and a second maximum working temperature T-MR of the second rear axle R-A permissible in absence of damage/reduction of service life.

It is worth noting that the first maximum value T-MF of the permissible working temperature of the first front axle F-A in the absence of damage/reduction of service life and the second maximum value T-MR of the permissible working temperature of the second rear axle R-A in the absence of damage/reduction of service life are parameters of the electric motors present in the actuators of the first front axle F-A and the second rear axle R-A.

In an embodiment, such values are stored in the central control unit 6 of the braking system 2 (FIGS. 3, 4, 5, 6).

In a further embodiment, as an alternative to the preceding one, these values are stored in the first local control unit 10 and the second local control unit 20 of the braking system 2 (FIGS. 3 and 4).

In more detail:
the first maximum working temperature value T-MF of the first front axle F-A is the maximum temperature value permissible by the electric motor adapted to command the actuator present in the first actuator module 3, in the absence of damage/reduction of service life;
the second maximum working temperature value T-MR of the second rear axle R-A is the maximum temperature value permissible by the electric motor adapted to command the actuator present in the second actuator module 4, in absence of damage/reduction of service life.

The second data processing module 220 is configured to determine a first maximum force value F-LM applicable by a first actuator module 3 adapted to command the first front axle F-A, as a function of the first piece of information T-SF representative of a first working temperature of a first front axle F-A of the vehicle 1 and the first maximum working temperature value T-MF of the first front axle F-A permissible in absence of damage/reduction of service life:

$$F\text{-}LM = f(T\text{-}SF, T\text{-}MF)$$

Furthermore, the second data processing module 220 is configured to determine a second maximum force value R-LM applicable by the second actuator module 4 adapted to command the second rear axle R-A, as a function of the second piece of information T-SR representative of a second working temperature of a second rear axle R-A of the vehicle 1 and the second maximum working temperature value T-MR of the second front rear axle R-A permissible in absence of damage/reduction of service life:

$$R\text{-}LM = f(T\text{-}SR, T\text{-}MR)$$

The applicable function from the second data processing module 220 is based on electric motor thermal modeling and, in general, on the heat transfer known in the technical field of the present invention.

Turning back to the diagram in FIG. 5, in an embodiment, the third data processing module 230 is configured to receive, from the second data processing module 220, the first braking force distribution value DF1 to be applied to the first front axle F-A and the second braking force distribution value DF2 to be applied to the second rear axle R-A.

Furthermore, in this embodiment, the third data processing module 230 is configured to receive, from the second data processing module 220, the first maximum force value F-LM applicable by the first actuator module 3 adapted to command the first front axle F-A and the second maximum force value R-LM applicable by the second actuator module 4 adapted to command the second rear axle R-A.

The third data processing module 230 is configured to determine the first target braking force $F1_T$ to be applied to the first front axle F-A of the vehicle 1 to obtain parking and a second target braking force $F2_T$ to be applied to the second rear axle R-A of the vehicle 1 to obtain parking, as a function of the first braking force distribution value DF1 to be applied to the first front axle F-A, the second braking force distribution value DF2 to be applied to the second rear axle R-A, the first maximum force value F-LM applicable by the first actuator module 3 adapted to command the first front axle F-A and the second maximum force value R-LM applicable by the second actuator module 4 adapted to command the second rear axle R-A.

In particular, the third data processing module 230 of the system 100 is configured to activate the respective operation in response to an activation signal received from a respective control logic (algorithm) installed on the vehicle 1 (e.g., in the central control unit 5 of the vehicle 1, in another data processing module present in the system 100, or an additional data processing unit present on the vehicle).

It is worth noting that the activation signal may be generated in particular conditions in which it is necessary to activate the parking function, e.g., such as when the vehicle is stationary and the driver's intention to park is identified and so forth.

Furthermore, the third data processing module 230 of the system 100 is configured to assign a high priority for calculating the respective braking force to be applied for parking between the first front axle F-A and the second rear axle R-A.

In greater detail, the third data processing module 230 is configured to determine a first difference magnitude F-GP representative of the difference between the first braking force distribution value DF1 to be applied to the first front axle F-A and the first maximum force value F-LM applicable by the first actuator module 3 adapted to command the first front axle F-A.

$$F\text{-}GP = DF1 - F\text{-}FM.$$

Furthermore, the third data processing module 230 is configured to determine a second difference magnitude R-GP representative of the difference between the second braking force distribution value DF2 to be applied to the second rear axle R-A and the second maximum force value R-LM applicable by the second actuator module 4 adapted to command the second rear axle R-A.

$$R\text{-}GP = DF2 - R\text{-}LM.$$

The third data processing module 230 is configured to assign a high priority to the axle having the lower of the first difference magnitude F-GP and the second difference magnitude R-GP and a low priority to the other axle.

Therefore, the third data processing module 230 is configured to define the high priority magnitudes (P1) and low priority magnitudes (P2):

if $F\text{-}GP \leq R\text{-}GP$ $$DF_{P1} = DF1$$

$$LM_{P1} = F\text{-}LM$$

$$DF_{P2} = DF2$$

$$LM_{P2} = R\text{-}LM$$

if $F\text{-}GP \geq R\text{-}GP$ $$DF_{P1} = DF2$$

$$LM_{P1} = R\text{-}LM$$

$$DF_{P2} = DF1$$

$$LM_{P2} = F\text{-}LM$$

Furthermore, the third data processing module 230 is configured to perform a first calculation of a first braking force value $F1_{P1}$ to be applied to achieve parking on the vehicle axle with high priority.

The first braking force value $F1_{P1}$ to be applied to obtain parking on the axle of the vehicle 1 with high priority (P1) is obtained as a minimum between the braking force distribution value $DF_{P1}$ to be applied on the axle of the vehicle 1 with high priority and the maximum force applicable value $LM_{P1}$ applicable by an actuator module adapted to command the axle with high priority.

$$F1_{P1} = \min(DF_{P1}, LM_{P1})$$

Furthermore, the third data processing module 230 is configured to perform a first calculation of a first braking force value $F2_{P2}$ to be applied to achieve parking on the vehicle axle with low priority.

If the difference magnitude $GP_{P1}$ (F-GP or R-GP) of the high priority axle is $\leq 0$:
the first braking force value $F2_{P2}$ to be applied to obtain parking on the axle of the vehicle 1 with low priority (P2) is obtained as a minimum between the braking force distribution value $DF_{P2}$ to be applied on the axle of the vehicle 1 with low priority and the maximum force applicable value $LM_{P2}$ applicable by an actuator module adapted to command the axle with low priority.

$$F2_{P2} = \min(DF_{P2}, LM_{P2})$$

If the difference magnitude $GP_{P1}$ (F-GP or R-GP) of the high priority axle >0:
the difference magnitude $GP_{P2}$ (F-GP or R-GP) of the low priority axle is obtained by adding the previously calculated magnitude difference $GP_{P1}$ of the high priority axle to the previously calculated magnitude difference $GP_{P2}$; $GP_{P2} = GP_{P2} + GP_{P1}$.

the first braking force value $GP_{P2}$ to be applied to obtain parking on the axle of the vehicle 1 with low priority (P2) is obtained as a minimum between the braking force (P2) distribution value $DF_{P2}$ to be applied on the axle of the vehicle 1 with low priority to which the difference magnitude $GP_{P1}$ of the axle with high priority and the maximum force applicable value $LM_{P2}$ applicable by an actuator module adapted to command the axle with low priority.

$$F2_{P2} = \min((DF_{P2} + GP_{P1}), LM_{P2})$$

According to an embodiment, the third data processing module 230 is configured to perform a second calculation of a second braking force value $F1'_{P1}$ to be applied to achieve parking on the vehicle axle with high priority.

In greater detail, in this second calculation, the second braking force value $F1'_{P1}$ to be applied to obtain parking on the axle of the vehicle with high priority is determined by the sum of the minimum of the absolute value of the difference magnitude $GP_{P1}$ of the axle with high priority and the difference magnitude $GP_{P2}$ of the axle with low priority and the first braking force value $F1_{P1}$ to be applied to obtain parking on the axle of the vehicle with high priority.

$$F1'_{P1} = \min(|GP_{P1}|, GP_{P2}) + F1_{P1}.$$

If the difference magnitude $GP_{P1}$ of the axle with the highest priority is $\geq 0$ and/or the difference magnitude $GP_{P2}$ of the axle with the low priority is <0, the third data processing module 230 is configured to assign the first braking force value $F1_{P1}$ to be applied to obtain parking on the previously calculated axle of the vehicle with high priority to the second braking force value $F1'_{P1}$ to be applied to obtain parking to the axle of the vehicle with high priority.

Furthermore, the third data processing module 230 is configured to assign a value of the first target braking force $F1_T$ to be applied to the first front axle F-A of the vehicle 1 to obtain parking and a value of the second target braking force $F2_T$ to be applied to the second rear axle R-A.

In greater detail, if the difference magnitude F-GP of the first front axle F-A is $\leq$ the difference magnitude R-GP of the second rear axle R-A (thus if the first front axle F-A is the axle with high priority), the third data processing module 230 is configured to assign the second braking force value $F1'_{P1}$ to be applied to obtain the parking on the axle of the vehicle with high priority as the value of the first target braking force $F1_T$ to be applied to the first front axle F-A of the vehicle 1 to obtain the parking.

If the difference magnitude F-GP of the first front axle F-A is > the difference magnitude R-GP of the second rear axle R-A (thus if the first front axle F-A is the axle with low priority), the third data processing module 230 is configured to assign the first braking force value $F2_{P2}$ to be applied to obtain the parking on the axle of the vehicle 1 with low priority as the value of the first target braking force $F1_T$ to be applied to the first front axle F-A of the vehicle 1 to obtain the parking.

If the difference magnitude F-GP of the first front axle F-A is > the difference magnitude R-GP of the second rear axle R-A (thus if the second rear axle R-A is the axle with high priority), the third data processing module 230 is configured to assign the second braking force value $F1'_{P1}$ to be applied to obtain parking on the axle of the vehicle with high priority as the value of the second target braking force $F2_T$ to be applied to the second rear axle R-A of the vehicle 1 to obtain parking.

If the difference magnitude F-GP of the first front axle F-A is > the difference magnitude R-GP of the second rear axle R-A (thus if the second rear axle R-A is the axle with the lower priority), the third data processing module 230 is configured to assign the first braking force value $F2_{P2}$ to be applied to obtain the parking on the axle of the vehicle 1 with low priority as value of the second target braking force $F2_T$ to be applied to the second rear axle R-A of the vehicle 1 to obtain the parking.

According to an embodiment, the third data processing module 230 is further configured to supply a piece of information NF representative of the unavailability of the parking function of the vehicle 1.

In greater detail, the third data processing module 230 is configured to compare the sum of the first braking force distribution value DF1 to be applied to the first front axle F-A and the second braking force distribution value DF2 to be applied to the second rear axle R-A with the sum of the first target braking force value $F1_T$ to be applied to the first front axle F-A of the vehicle 1 to obtain parking and the second target braking force value $F2_T$ to be applied to the second rear axle R-A.

If the sum of the first braking force distribution value DF1 to be applied to the first front axle F-A and the second braking force distribution value DF2 to be applied to the second rear axle R-A is < of the sum of the first target braking force value $F1_T$ to be applied to the first front axle F-A of the vehicle 1 to obtain parking and the second target braking force value $F2_T$ to be applied to the second rear axle R-A, the third data processing module 230 is configured to enable the information NF representative of the unavailability of the parking function of the vehicle 1, e.g. by setting such information to logical value 1 (unavailable function).

$(DF1+DF2)<(F1_T+F2_T) \rightarrow NF = \text{"1"}$.

If the sum of the first braking force distribution value DF1 to be applied to the first front axle F-A and the second braking force distribution value DF2 to be applied to the second rear axle R-A is of the sum of the first target braking force value $F1_T$ to be applied to the first front axle F-A of the vehicle 1 to obtain parking and the second target braking force value $F2_T$ to be applied to the second rear axle R-A, the third data processing module 230 is configured to disable the information NF representative of the unavailability of the parking function of the vehicle 1, e.g. by setting such information to the logical value 0 (available function).

$(DF1+DF2) \geq (F1_T+F2_T) \rightarrow NF = \text{"0"}$.

According to various embodiments, the third data processing module 230 is configured to supply the information NF representative of unavailability of the parking function of the vehicle 1, either as a software variable or as a signal through a communication channel in wired technology, to a supervisory control logic of the parking function or the central control unit 6 of the braking system 2 or the central control unit 5 of the vehicle 1 or, in general, to a further data processing unit present on the vehicle having a supervisory function of all activities of the systems on the vehicle.

Figure 8:
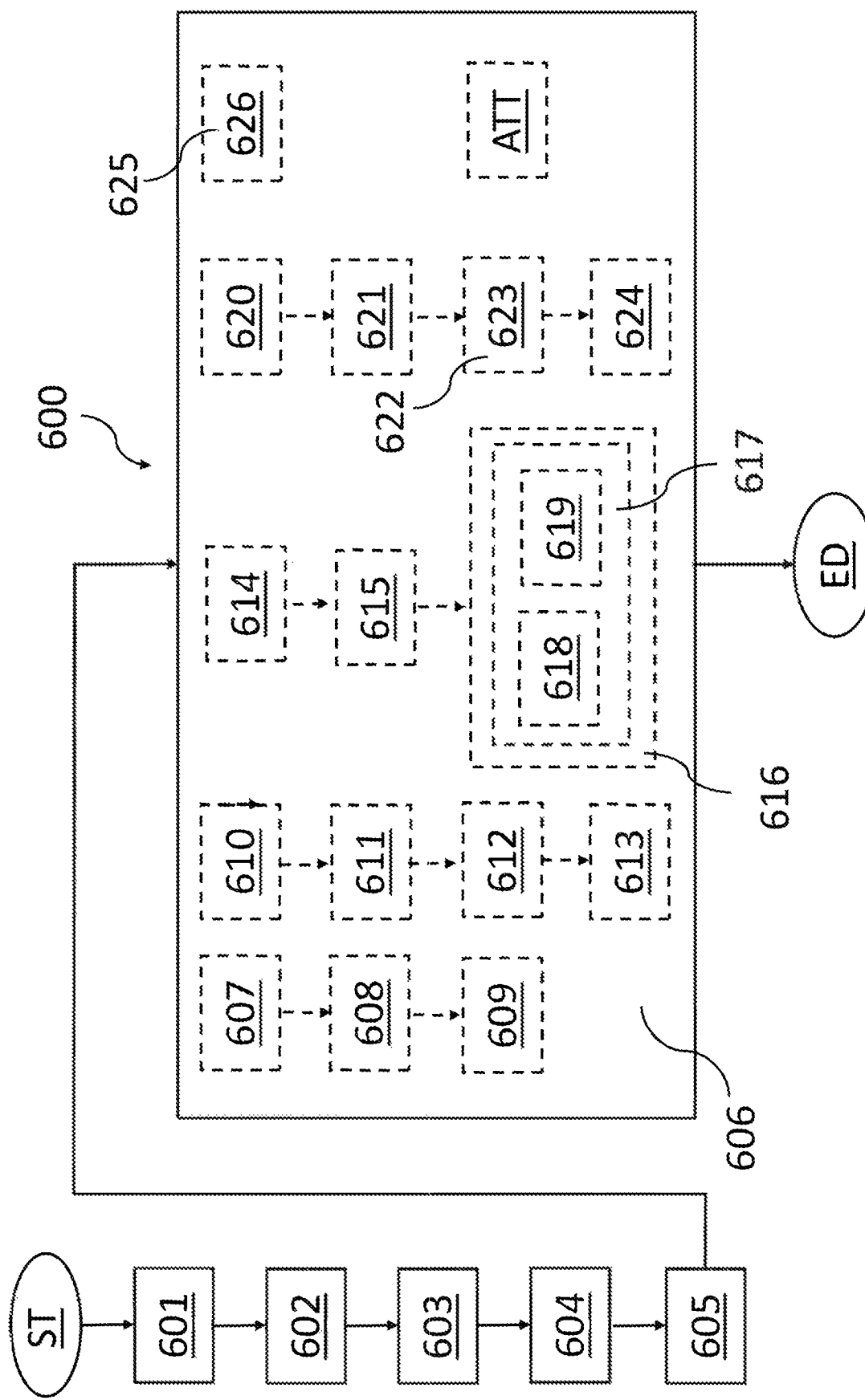
FIG. 8 shows, by means of a block chart, a method for controlling a braking system for the distribution of braking forces for parking the vehicle according to the present invention.

A method 600 for controlling a braking system for the distribution of braking forces for parking a vehicle will be described with reference to the aforesaid figures and the block chart in FIG. 8.

It is worth noting that the components and information mentioned below with the description of the method were described above with reference to the vehicle 1, the braking system 2, and the system 100 and will therefore not be repeated for the sake of brevity.

The method 600 comprises a symbolic step of starting ST.

The method 600 comprises a step of receiving 601, by a system 100 for controlling a braking system 2 for the distribution of braking forces for parking a vehicle 1, a first piece of information T-SF representative of a first working temperature of a first front axle F-A of the vehicle 1.

The first working temperature of a first front axle F-A of vehicle 1 was already described above.

The method 600 further comprises a step of receiving 602, by the system 100, a second piece of information T-SR representative of a second working temperature of a second axle R-A of the vehicle 1.

The second working temperature of a second rear axle R-A of the vehicle 1 was described above.

The method 600 further comprises a step of receiving 603, by the system 100, a third piece of information PZ representative of a gradient of the vehicle 1.

The third piece of information PZ representing a gradient of the vehicle 1 was described above.

The method 600 further comprises a step of receiving 604, by the system 100, a fourth piece of information AD representative of a coefficient of friction (grip) between the vehicle 1 (in particular, the wheel tires) and the road.

The fourth piece of information AD representative of a coefficient of friction between the vehicle 1 and the road was described above.

The method 600 further comprises a step of receiving 605, by the system 100, a fifth piece of information PV representative of a weight of the vehicle 1.

The method 600 further comprises a step of determining 606, by the system 100, a first target braking force $F1_T$ to be applied to the first front axle F-A of the vehicle 1 to obtain parking and a second target braking force $F2_T$ to be applied to the second rear axle R-A based on the first piece of information T-SF representative of a first working temperature of a first front axle F-A of the vehicle 1, the second piece of information T-SR representative of a second working temperature of a second axle R-A of the vehicle 1, the third piece of information PZ representative of a gradient of the vehicle 1, the fourth piece of information AD representative of a coefficient of friction between the vehicle 1 and the road, the fifth piece of information PV representative of a weight of the vehicle 1.

According to an embodiment, shown with dashed lines in FIG. 6, the step of determining 606 comprises a step of receiving 607 by a first data processing module 210 of the system 100, the third piece of information PZ representative of the gradient of the vehicle 1, the fourth piece of information AD representative of a coefficient of friction between the vehicle 1 and the road, the fifth piece of information PV representative of a weight of the vehicle 1.

According to this embodiment, the step of determining 606 further comprises a step of receiving 608, by the first data processing module 210, further vehicle parameters UPV.

Such further vehicle parameters UPV have been previously described.

According to this embodiment, the step of determining 606 further comprises a step of determining 609, by the first data processing module 210, as a function of the third information PZ representative of a gradient of the vehicle 1, the fourth information AD representative of a coefficient of friction between the vehicle 1 and the road, the fifth information PV representative of a weight of the vehicle 1 and the further vehicle parameters UPV:

a value FW-F representative of the maximum permissible ground force on the first front axle F-A of the vehicle 1 in absence of wheel slip present on the first front axle F-A;

a value FW-R representative of the maximum permissible ground force on the second rear axle R-A of the vehicle 1 in absence of wheel slip present on the second rear axle R-A;

a value FL-F representative of a longitudinal force to be applied to the first front axle F-A of the vehicle 1 to obtain parking;

a value FL-R representative of a longitudinal force to be applied to the second rear axle R-A of the vehicle 1 to obtain parking;

a first braking force distribution value DF1 to be applied to the first front axle F-A;

a second braking force distribution value DF2 to be applied to the second rear axle R-A.

The details of the mathematical relations performed in this regard by the first data processing module 210 have already been described above.

The step of determining 609 is performed by the first data processing module 210 to determine the first braking force distribution value DF1 to be applied to the first front axle F-A as the minimum between the value FW-F representative of the maximum permissible ground force on the first front axle F-A of the vehicle 1 in absence of wheel slip present on the first front axle F-A and the value FL-F representative of a longitudinal force to be applied to the first front axle F-A of the vehicle 1 to obtain parking.

Furthermore, the step of determining 609 is performed by the first data processing module 210 to determine the second braking force distribution value DF2 to be applied to the second rear axle R-A as the minimum between the value FW-R representative of the maximum permissible ground force on the second rear axle R-A of the vehicle 1 in absence of wheel slip present on the second rear axle R-A and the value FL-R representative of a longitudinal force to be applied to the second rear axle R-A of the vehicle 1 to obtain parking.

According to an embodiment, in combination with the preceding one, shown with dashed lines in FIG. 6, the step of determining 606 comprises a step of receiving 610, by a second data processing module 220 of the system 100, the first piece of information T-SF representative of a first working temperature of a first front axle F-A of the vehicle 1 and the second piece of information T-SR representative of a second working temperature of a second axle R-A of the vehicle 1.

Furthermore, according to this embodiment, the step of determining 606 further comprises a step of receiving 611, by the second data processing module 220, a first maximum working temperature T-MF of the first front axle F-A permissible in absence of damage/reduction of service life and a second maximum working temperature T-MR of the second rear axle R-A permissible in absence of damage/reduction of service life.

The first maximum value T-MF of working temperature of the first front axle F-A permissible in the absence of damage/reduction of service life and the second maximum value T-MR of working temperature of the second rear axle R-A permissible in the absence of damage/reduction of service life have been described above.

According to this embodiment, the step of determining 606 comprises a step of determining 612, by the second data processing module 220, a first maximum force value F-LM applicable by a first actuator module 3 adapted to command the first front axle F-A, as a function of the first piece of information T-SR representative of a first working temperature of a first front rear axle F-A of the vehicle 1 and the first maximum working temperature value T-MR of the first front axle F-A permissible in absence of damage/reduction of service life.

Furthermore, the step of determining 606 comprises a step of determining 613, by the second data processing module 220, a second maximum force value R-LM applicable by the second actuator module 4 adapted to command the second rear axle R-A, as a function of the second piece of information T-SR representative of second working temperature of a second rear axle R-A of the vehicle 1 and of the second maximum working temperature value T-MR of the second rear axle R-A permissible in absence of damage/reduction of service life.

It is emphasized that the applicable function from the second data processing module 220 is based on electric motor thermal modeling and general heat transfer known in the technical field of the present invention.

In an embodiment, in combination with the preceding one, the step of determining 606 comprises a step of receiving 614 from the second data processing module 220, by a third processing module of the system 100, the first braking force distribution value DF1 to be applied to the first front axle F-A and the second braking force distribution value DF2 be applied to the second rear axle R-A.

Furthermore, in this embodiment, the step of determining 606 comprises a step of receiving 615 from the second data processing module 220, by the third data processing module 230, the first maximum force value F-LM applicable by the first actuator module 3 adapted to command the first front axle F-A and the second maximum force value R-LM applicable by the second actuator module 4 adapted to command the second rear axle R-A.

According to this embodiment, the step of determining 606 comprises a step of determining 616, by the third data processing module 230, a first target braking force $F1_T$ to be applied to the first front axle F-A of the vehicle 1 to obtain parking and a second target braking force $F2_T$ to be applied to the second rear axle R-A of the vehicle 1 to obtain parking, as a function of the first braking force distribution value DF1 to be applied to the first front axle F-A, the second braking force distribution value DF2 to be applied to the second rear axle R-A, the first maximum force value F-LM applicable by the first actuator module 3 adapted to command the first front axle F-A and the second maximum force value R-LM applicable by the second actuator module 4 adapted to command the second rear axle R-A.

In particular, according to an embodiment, in combination with the preceding ones, the step of determining 616 comprises a step of activating ATT, by the third data processing module 230, the operation of the system 100 in response to an activation signal received from a respective control logic (algorithm) installed on the vehicle 1 (e.g., the central control unit 5 of the vehicle 1, another data processing module of the system 100, or an additional data processing unit present on the vehicle.

It is emphasized that the activation signal may be generated in particular conditions where it is necessary to activate the parking function, e.g., such as when the vehicle is stationary and the driver's intention to park is identified and so forth.

According to an embodiment, the step of determining 616 comprises a step of assigning 617, by the third data processing module 230, a high priority for calculating the respective target braking force to be applied for parking between the first front axle F-A and the second rear axle R-A.

In greater detail, the step of assigning 617 comprises a step of determining 618, by the third data processing module 230, a first difference magnitude F-GP representative of the difference between the first braking force distribution value DF1 to be applied to the first front axle F-A and the first maximum force value F-LM applicable by the first actuator module 3 adapted to command the first front axle F-A.

Furthermore, the step of assigning 617 comprises a step of determining 619, by the third data processing module 230, a second difference magnitude R-GP representative of the difference between the second braking force distribution value DF2 to be applied to the second front rear axle R-A and the second maximum force value R-LM applicable by the second actuator module 4 adapted to command the second rear axle R-A.

The step of assigning 617 assigns high priority to the axle with the lowest difference magnitude between the first difference magnitude F-GP and the second difference magnitude R-GP.

The definitions of high priority magnitudes (P1) and low priority magnitudes (P2) were supplied above.

According to an embodiment, in combination with the preceding one, the step of determining 606 comprises a step of performing 620, by the third data processing module 230, a first calculation of a first braking force value $F1_{P1}$ to be applied to obtain parking on the axle of the vehicle with high priority.

The first braking force value F1 P1 to be applied to obtain parking on the axle of the vehicle 1 with high priority (P1) is obtained as a minimum between the braking force distribution value $DF_{P1}$ to be applied on the axle of the vehicle 1 with high priority and the maximum force value $LM_{P1}$ applicable by an actuator module adapted to command the axle with high priority.

$$F1_{P1}=\min(DF_{P1},LM_{P1})$$

Furthermore, the step of determining 606 comprises a step of performing 621, by the third data processing module 230, a first calculation of a first braking force value $F2_{P2}$ to be applied to obtain parking on the axle of the vehicle with low priority.

If the difference magnitude $GP_{P1}$ (F-GP or R-GP) of the high priority axle is ≤0:
the first braking force value $F2_{P2}$ to be applied to obtain parking on the axle of the vehicle 1 with low priority (P2) is obtained as a minimum between the braking force distribution value $DF_{P2}$ to be applied on the axle of the vehicle 1 with low priority and the maximum force applicable value $LM_{P2}$ applicable by an actuator module adapted to command the axle with low priority.

$$F2_{P2}=\min(DF_{P2},LM_{P2})$$

If the difference magnitude $GP_{P1}$ (F-GP or R-GP) of the high priority axle >0:
the difference magnitude $GP_{P2}$ (F-GP or R-GP) of the low priority axle is obtained by adding the previously calculated magnitude difference $GP_{P1}$ of the high priority axle to the previously calculated magnitude difference $GP_{P2}$; $GP_{P2}=GP_{P2}+GP_{P1}$.
the first braking force value $GP_{P2}$ to be applied to obtain parking on the axle of the vehicle 1 with low priority (P2) is obtained as a minimum between the braking force distribution value $DF_{P2}$ to be applied on the axle of the vehicle 1 with low priority to which the difference magnitude $GP_{P1}$ of the axle with high priority is added and the maximum force applicable value $LM_{P2}$ applicable by an actuator module adapted to command the axle with low priority.

$$F2_{P2}=\min((DF_{P2}+GP_{P1}),LM_{P2})$$

According to this embodiment, the step of determining 606 further comprises a step of performing 622, by the third data processing module 230, a second calculation of a second braking force value $F1'_{P1}$ to be applied to obtain parking on the axle of the vehicle with high priority.

In greater detail, in this second calculation, the second braking force value $F1'_{P1}$ to be applied to obtain parking on the axle of the vehicle with high priority is determined by the sum of the minimum of the absolute value of the difference magnitude $GP_{P1}$ of the axle with high priority and the difference magnitude $GP_{P2}$ of the axle with low priority and the first braking force value $F1_{P1}$ to be applied to obtain parking on the axle of the vehicle with high priority.

$$F1'_{P1}=\min(|GP_{P1}|,GP_{P2})+F1_{P1}.$$

If the difference magnitude $GP_{P1}$ of the axle with the highest priority is ≥0 and/or the difference magnitude $GP_{P2}$ of the axle with the lower priority is <0, the step of performing 622 comprises a step of assigning 623, by the third data processing module 230, to the second braking force value $F1'_{P1}$ to be applied to obtain parking to the axle of the vehicle with high priority the first braking force value $F1_{P1}$ to be applied to obtain parking on the previously calculated axle of the vehicle with high priority.

According to an embodiment, in combination with the preceding one, the step of determining 606 comprises a step of assigning 624, by the third data processing module 230, a value of the first target braking force $F1_T$ to be applied to the first front axle F-A of the vehicle 1 to obtain parking and a value of the second target braking force $F2_T$ to be applied to the second rear axle R-A.

In greater detail, if the difference magnitude F-GP of the first front axle F-A is the difference magnitude R-GP of the second rear axle R-A (thus if the first front axle F-A is the axle with high priority), the step of assigning 624 is performed, by the third data processing module 230, assigning as the value of the first target braking force $F1_T$ to be applied to the first front axle F-A of the vehicle 1 to obtain the parking, the second braking force value $F1'_{P1}$ to be applied to obtain the parking on the axle of the vehicle with high priority.

If the difference magnitude F-GP of the first front axle F-A is > the difference magnitude R-GP of the second rear axle R-A (thus if the first front axle F-A is the axle with low priority), the step of assigning 624 is performed, by the third data processing module 230, assigning as the value of the first target braking force $F1_T$ to be applied to the first front axle F-A of the vehicle 1 to obtain the parking, the first braking force value $F2_{P2}$ to be applied to obtain the parking on the axle of the vehicle 1 with lower priority.

If the difference magnitude F-GP of the first front axle F-A is > the difference magnitude R-GP of the second rear axle R-A (thus if the second rear axle R-A is the axle with high priority), the step of assigning 624 is performed, by the third data processing module 230, by assigning as the value of the second target braking force $F2_T$ to be applied the second braking force value $F1'_{P1}$ to be applied to obtain parking on the axle of the vehicle with high priority to the second rear axle R-A of the vehicle 1 to obtain parking.

If the difference magnitude F-GP of the first front axle F-A is > the difference magnitude R-GP of the second rear axle R-A (thus if the second rear axle R-A is the axle with lower priority), the step of assigning 624 is performed, by the third data processing module 230, assigning as the value of the second target braking force $F2_T$ to be applied on the second rear axle F-A of the vehicle 1 to obtain the parking the first braking force value $F2_{P2}$ to be applied to obtain the parking on the axle of the vehicle 1 with lower priority.

According to an embodiment, in combination with any one of those described above, the step of determining 606 comprises a step of supplying 625, by the third data processing module 230, a piece of information NF representative of the unavailability of the parking function of the vehicle 1.

Such information NF representative of unavailability of the vehicle parking function 1 was described above.

In this embodiment, the step of supplying 625 comprises a step of comparing 626, by the third data processing module 230, the sum of the first braking force distribution value DF1 to be applied to the first front axle F-A and the second braking force distribution value DF2 to be applied to the second rear axle R-A with the sum of the first target braking force value $F1_T$ to be applied to the first front axle F-A of the vehicle 1 to obtain parking and the second target braking force value $F2_T$ to be applied to the second rear axle R-A.

If the sum of the first braking force distribution value DF1 to be applied to the first front axle F-A and the second braking force distribution value DF2 to be applied to the second rear axle R-A is < of the sum of the first target braking force value $F1_T$ to be applied to the first front axle F-A of the vehicle 1 to obtain parking and the second target braking force value $F2_T$ to be applied to the second rear axle R-A, the step of supplying 625 comprises a step of enabling 627, by the third data processing module (230), the information NF representative of the unavailability of the parking function of the vehicle 1. e.g. by setting such information to the logical value 1 (unavailable function).

$$(DF1+DF2)<(F1_T+F2_T) \rightarrow NF = \text{``1''}.$$

If the sum of the first braking force distribution value DF1 to be applied to the first front axle F-A and the second braking force distribution value DF2 to be applied to the second rear axle R-A is the sum of the first target braking force value $F1_T$ to be applied to the first front axle F-A of the vehicle 1 to obtain parking and the second target braking force value $F2_T$ to be applied to the second rear axle R-A, the step of supplying 625 comprises a step of disabling 628, by the third data processing module 230, the information NF representative of the unavailability of the parking function of the vehicle 1, e.g. setting this information to the logical value 0 (available function).

$$(DF1+DF2) \geq (F1_T+F2_T) \rightarrow NF = \text{``0''}.$$

Figure 2:
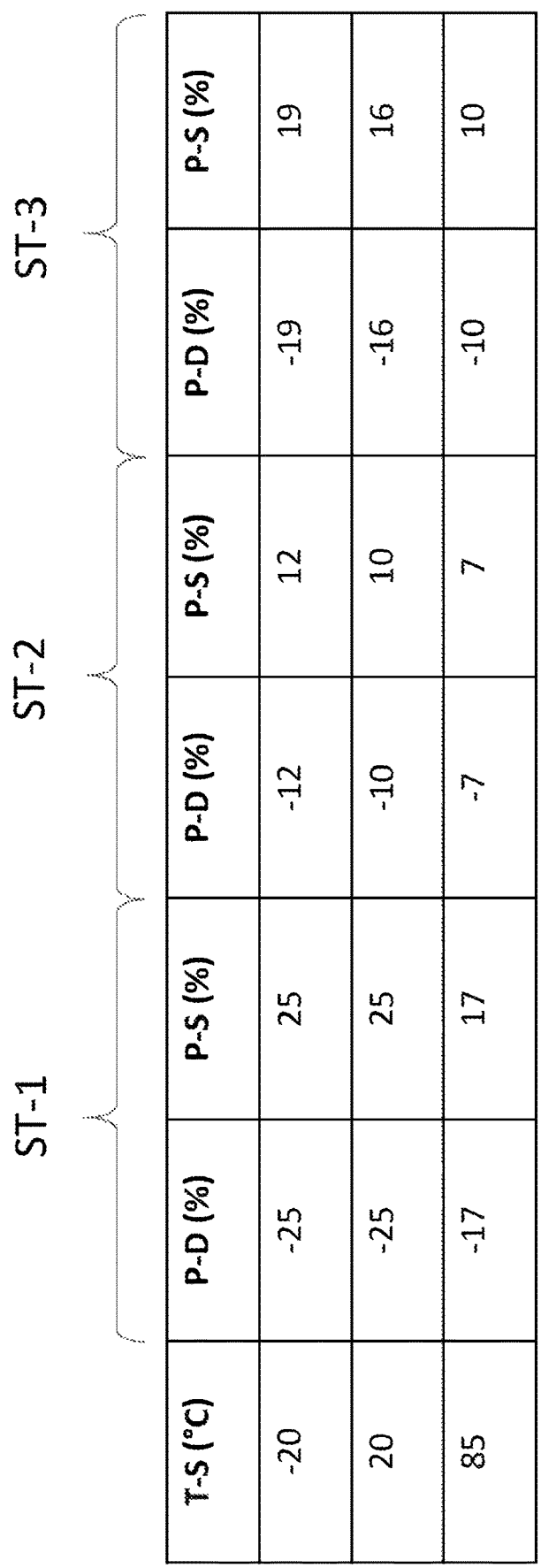
FIG. 2 shows, by means of a table, a comparison of maximum gradients of a vehicle with independent axles for parking a vehicle as a function of the system working temperature values, according to the prior art.

Again, by way of example, FIG. 2 shows a table comparing the maximum gradients of a vehicle with independent axles for reliable parking as a function of the system working temperature values, according to the prior art.

The table in FIG. 7 shows the following data from left to right:
the system working temperature values TS in the first column;
gradient values in the second and third columns, respectively;
permissible downhill P-D and uphill P-S for a parking STZ of the vehicle 1 by distributing braking forces on the first front axle F-A and the second rear axle R-A of the vehicle 1 according to the method and related system of the present invention.

As can be seen, with the same system working temperature values TS, relative to the solutions of the prior art the performance of which is shown in FIG. 2, the method and system thereof according to the present invention allows to achieve the parking of the vehicle 1 at higher maximum parking gradients of the vehicle 1, thereby increasing the performance of the braking system 2 and thus of the vehicle 1 in general.

The method and system thereof of the invention advantageously allow to maximize the ability of the braking system to park on a gradient without incurring thermal damage to the electric motors by using the working temperature of the electric motor, the road gradient, and the road-tire friction information.

Furthermore, again relative to the solutions of the prior art, the method and the system thereof subject of the invention also guarantee a longer holding time of the parking at the same gradient.

Indeed, comparing the performance in terms of holding time achievable with the method and system of the present invention with a solution of the prior art, it can be noted that the method and system object of the present invention allow to obtain higher holding times on the same road gradient without incurring in damage to the motors.

A person skilled in the art may make changes and adaptations to the embodiment of the method and respective system described above or can replace elements with others which are functionally equivalent to satisfy contingent needs without departing from the scope of protection of the appended claims. All the features described above as belonging to one possible embodiment may be implemented independently from the other described embodiments.

The invention claimed is:

1. A method for controlling a braking system of a vehicle for the distribution of braking forces for parking the vehicle, comprising steps of:
receiving, by a system for controlling the braking system of the vehicle for the distribution of braking forces for parking the vehicle, a first piece of information representative of a first working temperature of an electric motor of one or more actuators of at least one first actuator module operatively connected to a first front axle of the vehicle and adapted to implement a braking command based on control received from a respective actuator control module;
receiving, by the system, a second piece of information representative of a second working temperature of an electric motor of one or more actuators of at least one second actuator module operatively connected to a second rear axle of the vehicle and adapted to implement a braking command based on control received from a respective actuator control module;
receiving, by the system, a third piece of information representative of a gradient of the vehicle;
receiving, by the system, a fourth piece of information representative of a coefficient of friction between the vehicle and a road;
receiving, by the system, a fifth piece of information representative of a weight of the vehicle; and
determining, by the system, a first target braking force to be applied to the first front axle of the vehicle to obtain parking and a second target braking force to be applied to the second rear axle based on the first piece of information representative of a first working temperature of an electric motor of one or more actuators of at least one first actuator module operatively connected to the first front axle of the vehicle, the second piece of information representative of a second working temperature of an electric motor of one or more actuators of at least one second actuator module operatively connected to the second rear axle of the vehicle, the third piece of information representative of a gradient of the vehicle, the fourth piece of information representative of a coefficient of friction between the vehicle and a road, and the fifth piece of information representative of a weight of the vehicle.

2. The method according to claim 1, wherein the step of determining, by the system, the first target braking force to be applied to the first front axle of the vehicle to obtain parking and the second target braking force to be applied to the second rear axle comprises steps of:
  receiving, by a first data processing module of the system, the third piece of information representative of a gradient of the vehicle, the fourth piece of information representative of a coefficient of friction between the vehicle and a road, and the fifth piece of information representative of a weight of the vehicle;
  receiving, by the first data processing module, further vehicle parameters;
  determining, by the first data processing module, as a function of the third piece of information representative of a gradient of the vehicle, the fourth piece of information representative of a coefficient of friction between the vehicle and a road, the fifth piece of information representative of a weight of the vehicle and the further vehicle parameters:
    a value representative of a maximum permissible ground force on the first front axle of the vehicle in absence of wheel slip present on the first front axle;
    a value representative of a maximum permissible ground force on the second rear axle of the vehicle in absence of wheel slip present on the second rear axle;
    a value representative of a longitudinal force to be applied to the first front axle of the vehicle to obtain parking;
    a value representative of a longitudinal force to be applied to the second rear axle of the vehicle to obtain parking;
    a first braking force distribution value to be applied to the first front axle; and
    a second braking force distribution value to be applied to the second rear axle.

3. The method according to claim 2, wherein the step of determining is performed by the first data processing module to determine the first braking force distribution value to be applied to the first front axle as a minimum between the value representative of a maximum permissible ground force on the first front axle of the vehicle in absence of wheel slip present on the first front axle and the value representative of a longitudinal force to be applied to the first front axle of the vehicle to obtain parking, the step of determining being performed by the first data processing module to determine the second braking force distribution value to be applied to the second rear axle as a minimum between the value representative of a maximum permissible ground force on the second rear axle of the vehicle in absence of wheel slip present on the second rear axle and the value representative of a longitudinal force to be applied to the second rear axle of the vehicle to obtain parking.

4. The method according to claim 3, wherein the step of determining, by the system, the first target braking force to be applied to the first front axle of the vehicle to obtain parking and the second target braking force to be applied to the second rear axle comprises steps of:
  receiving, by a second data processing module of the system, the first information representative of a first working temperature of an electric motor of one or more actuators of at least one first actuator module operatively connected to the first front axle of the vehicle and adapted to implement a braking command based on control received from a respective actuator control module and the second information representative of a second working temperature of an electric motor of one or more actuators of at least one second actuator module operatively connected to the second rear axle of the vehicle and adapted to implement a braking command based on control received from a respective actuator control module;
  receiving, by the second data processing module, a first maximum working temperature of an electric motor of one or more actuators of at least one first actuator module operatively connected to the first front axle permissible in absence of damage/reduction of service life and a second maximum working temperature of an electric motor of one or more actuators of at least one second actuator module operatively connected to the second rear axle permissible in absence of damage/reduction of service life;
  determining, by the second data processing module, a first maximum force value applicable by a first actuator module adapted to command the first front axle, as a function of the first piece of information representative of a first working temperature of an electric motor of one or more actuators of at least one first actuator module operatively connected to the first front axle of the vehicle and of the first maximum working temperature value of an electric motor of one or more actuators of at least one first actuator module operatively connected to the first front axle permissible in absence of damage/reduction of service life;
  determining, by the second data processing module, a second maximum force value applicable by a second actuator module adapted to command the second rear axle, as a function of the second piece of information representative of a second working temperature of an electric motor of one or more actuators of at least one second actuator module operatively connected to the second rear axle of the vehicle and of the second maximum working temperature value of an electric motor of one or more actuators of at least one second actuator module operatively connected to the second rear axle permissible in absence of damage/reduction of service life.

5. The method according to claim 4, wherein the step of determining, by the system, the first target braking force to be applied to the first front axle of the vehicle to obtain parking and the second target braking force to be applied to the second rear axle comprises steps of:
  receiving from the second data processing module, by a third data processing module of the system, the first braking force distribution value to be applied to the first front axle and the second braking force distribution value be applied to the second rear axle;
  receiving from the second data processing module, by the third data processing module, the first maximum force value applicable by the first actuator module adapted to command the first front axle and the second maximum force value applicable from the second actuator module adapted to command the second rear axle;
  determining, by the third data processing module, a first target braking force to be applied to the first front axle of the vehicle to obtain parking and a second target braking force to be applied to the second rear axle of the vehicle to obtain parking, as a function of the first braking force distribution value to be applied to the first front axle, the second braking force distribution value to be applied to the second rear axle, the first maximum force value applicable by the first actuator module adapted to command the first front axle and the second maximum force value applicable by the second actuator module adapted to command the second rear axle.

6. The method according to claim 5, wherein the step of determining, by the third data processing module, the first target braking force to be applied to the first front axle of the vehicle comprises a step of assigning, by the third data processing module, high priority for calculating a respective target braking force to be applied for parking between the first front axle and the second rear axle.

7. The method according to claim 6, wherein the step of assigning comprises steps of:
   determining, by the third data processing module, a first difference magnitude representative of the difference between the first braking force distribution value to be applied to the first front axle and the first maximum force value applicable by the first actuator module adapted to command the first front axle;
   determining, by the third data processing module, a second difference magnitude representative of the difference between the second braking force distribution value to be applied to the second rear axle and the second maximum force value applicable by the second actuator module adapted to command the second rear axle; and
   assigning high priority to the axle with lowest difference magnitude between the first difference magnitude and the second difference magnitude.

8. The method according to claim 7, wherein the step of determining, by the system, the first target braking force to be applied to the first front axle of the vehicle to obtain parking and the second target braking force to be applied to the second rear axle comprises a step of performing, by the third data processing module, a first calculation of a first braking force value to be applied to obtain parking on the axle of the vehicle with high priority, the first braking force value to be applied to obtain parking on the axle of the vehicle with high priority being obtained as a minimum between a braking force distribution value to be applied on the axle of the vehicle with high priority and a maximum force value applicable by an actuator module adapted to command the axle with high priority.

9. The method according to claim 8, wherein the step of determining, by the system, the first target braking force to be applied to the first front axle of the vehicle to obtain parking and the second target braking force to be applied to the second rear axle comprises a step of performing, by the third data processing module, a first calculation of a first braking force value to be applied to obtain parking on the axle of the vehicle with low priority,
   if the difference magnitude of the axle with high priority is ≤0, the first braking force value to be applied to obtain parking on the axle of the vehicle with low priority is obtained as a minimum between a braking force distribution value to be applied on the axle of the vehicle with low priority and a maximum force value applicable by an actuator module adapted to command the axle with low priority,
   if the difference magnitude of the axle with high priority is >0, the difference magnitude of the axle with low priority is obtained by adding to the difference magnitude of the previously calculated axle with low priority the difference magnitude of the axle with high priority, the first braking force value to be applied to obtain parking on the axle of the vehicle with low priority being obtained as a minimum between the braking force distribution value to be applied on the axle of the vehicle with low priority to which the difference magnitude of the axle with high priority and the maximum force value applicable by an actuator module adapted to command the axle with low priority is added.

10. The method according to claim 9, wherein the step of determining, by the system, the first target braking force to be applied to the first front axle of the vehicle to obtain parking and the second target braking force to be applied to the second rear axle further comprises a step of performing, by the third data processing module, a second calculation of a second braking force value to be applied to obtain parking on the axle of the vehicle with high priority, the second braking force value to be applied to obtain parking on the axle of the vehicle with high priority being determined by the sum of the minimum of the absolute value of the difference magnitude of the axle with high priority and the difference magnitude of the axle with low priority and the first braking force value to be applied to obtain parking on the axle of the vehicle with high priority,
   if the difference magnitude of the axle with highest priority is ≥0 and/or the difference magnitude of the axle with the lower priority is <0, the step of performing comprises a step of assigning, by the third data processing module, to the second braking force value to be applied to obtain parking to the axle of the vehicle with high priority the first braking force value to be applied to obtain parking on the previously calculated axle of the vehicle with high priority.

11. The method according to claim 10, wherein the step of determining, by the system, the first target braking force to be applied to the first front axle of the vehicle to obtain parking and the second target braking force to be applied to the second rear axle comprises a step of assigning, by the third data processing module, a value of the first target braking force to be applied to the first front axle of the vehicle to obtain parking and a value of the second target braking force to be applied to the second rear axle,
   if the difference magnitude of the first front axle is ≤ the difference magnitude of the second rear axle, the step of assigning is performed, by the third data processing module, by assigning as the value of the first target braking force to be applied to the first front axle of the vehicle to obtain parking, the second braking force value to be applied to obtain parking on the axle of the vehicle with high priority,
   if the difference magnitude of the first front axle is > the difference magnitude of the second rear axle, the step of assigning is performed, by the third data processing module, by assigning as the value of the first target braking force to be applied to the first front axle of the vehicle to obtain parking, the first braking force value to be applied to obtain parking on the axle of the vehicle with lower priority,
   if the difference magnitude of the first front axle is > the difference magnitude of the second rear axle, the step of assigning is performed, by the third data processing module, by assigning as the value of the second target braking force to be applied to the second rear axle of the vehicle to obtain parking, the second braking force value to be applied to obtain parking on the axle of the vehicle with high priority, if the difference magnitude of the first front axle is > the difference magnitude of the second rear axle, the step of assigning is performed, by the third data processing module, by assigning as the value of the second target braking force to be applied to the second rear axle of the vehicle to obtain parking, the first braking force value to be applied to obtain parking on the axle of the vehicle with lower priority.

12. The method according to claim 5, wherein the step of determining, by the system, the first target braking force to be applied to the first front axle of the vehicle to obtain parking and the second target braking force to be applied to the second rear axle comprises a step of supplying, by the third data processing module, a piece of information representative of unavailability of parking function of the vehicle.

13. The method according to claim 12, wherein the step of supplying comprises a step of comparing, by the third data processing module, the sum of the first braking force distribution value to be applied to the first front axle and the second braking force distribution value to be applied to the second rear axle with the sum of the first target braking force value to be applied to the first front axle of the vehicle to obtain parking and the second target braking force value to be applied to the second rear axle,
   if the sum of the first braking force distribution value to be applied to the first front axle and the second braking force distribution value to be applied to the second rear axle is < of the sum of the first target braking force value to be applied to the first front axle of the vehicle to obtain parking and the second target braking force value to be applied to the second rear axle, the step of supplying comprises a step of enabling, by the third data processing module, the information representative of unavailability of parking function of the vehicle,
   if the sum of the first braking force distribution value to be applied to the first front axle and the second braking force distribution value to be applied to the second rear axle is ≥ the sum of the first target braking force value to be applied to the first front axle of the vehicle to obtain parking and the second target braking force value to be applied to the second rear axle, the step of supplying comprises a step of disabling, by the third data processing module, the information representative of unavailability of parking function of the vehicle.

14. A system for controlling a braking system of a vehicle for the distribution of braking forces for parking the vehicle, configured to:
   receive a first piece of information representative of a first working temperature of an electric motor of one or more actuators of at least one first actuator module operatively connected to a first front axle of the vehicle and adapted to implement a braking command based on control received from a respective actuator control module;
   receive a second piece of information representative of a second working temperature of an electric motor of one or more actuators of at least one second actuator module operatively connected to a second rear axle of the vehicle and adapted to implement a braking command based on control received from a respective actuator control module;
   receive a third piece of information representative of a gradient of the vehicle;
   receive a fourth piece of information representative of a coefficient of friction between the vehicle and a road;
   receive a fifth piece of information representative of a weight of the vehicle; and
   determine a first target braking force to be applied to the first front axle of the vehicle to obtain parking and a second target braking force to be applied to the second rear axle based on the first piece of information representative of a first working temperature of an electric motor of one or more actuators of at least one first actuator module operatively connected to the first front axle of the vehicle, the second piece of information representative of a second working temperature of an electric motor of one or more actuators of at least one second actuator module operatively connected to the second rear axle of the vehicle, the third piece of information representative of a gradient of the vehicle, the fourth piece of information representative of a coefficient of friction between the vehicle and a road, and the fifth piece of information representative of a weight of the vehicle.

15. The system according to claim 14, comprising:
a first data processing module;
a second data processing module; and
a third data processing module,
the system being configured to perform the steps of a method for controlling a braking system of a vehicle for the distribution of braking forces for parking the vehicle, comprising steps of:
receiving, by the system, a first piece of information representative of a first working temperature of an electric motor of one or more actuators of at least one first actuator module operatively connected to a first front axle of the vehicle and adapted to implement a braking command based on control received from a respective actuator control module;
receiving, by the system, a second piece of information representative of a second working temperature of an electric motor of one or more actuators of at least one second actuator module operatively connected to a second rear axle of the vehicle and adapted to implement a braking command based on control received from a respective actuator control module;
receiving, by the system, a third piece of information representative of a gradient of the vehicle;
receiving, by the system, a fourth piece of information representative of a coefficient of friction between the vehicle and a road;
receiving, by the system, a fifth piece of information representative of a weight of the vehicle; and
determining, by the system, a first target braking force to be applied to the first front axle of the vehicle to obtain parking and a second target braking force to be applied to the second rear axle based on the first piece of information representative of a first working temperature of an electric motor of one or more actuators of at least one first actuator module operatively connected to the first front axle of the vehicle, the second piece of information representative of a second working temperature of an electric motor of one or more actuators of at least one second actuator module operatively connected to the second rear axle of the vehicle, the third piece of information representative of a gradient of the vehicle, the fourth piece of information representative of a coefficient of friction between the vehicle and a road, and the fifth piece of information representative of a weight of the vehicle,
wherein the step of determining the first target braking force to be applied to the first front axle of the vehicle to obtain parking and the second target braking force to be applied to the second rear axle comprises steps of:

receiving, by the first data processing module of the system, the third piece of information representative of a gradient of the vehicle, the fourth piece of information representative of a coefficient of friction between the vehicle and a road, and the fifth piece of information representative of a weight of the vehicle;

receiving, by the first data processing module, further vehicle parameters;

determining, by the first data processing module, as a function of the third piece of information representative of a gradient of the vehicle, the fourth piece of information representative of a coefficient of friction between the vehicle and a road, the fifth piece of information representative of a weight of the vehicle and the further vehicle parameters:
- a value representative of a maximum permissible ground force on the first front axle of the vehicle in absence of wheel slip present on the first front axle;
- a value representative of a maximum permissible ground force on the second rear axle of the vehicle in absence of wheel slip present on the second rear axle;
- a value representative of a longitudinal force to be applied to the first front axle of the vehicle to obtain parking;
- a value representative of a longitudinal force to be applied to the second rear axle of the vehicle to obtain parking;
- a first braking force distribution value to be applied to the first front axle; and
- a second braking force distribution value to be applied to the second rear axle.

16. The system according to claim 15, wherein the step of determining is performed by the first data processing module to determine the first braking force distribution value to be applied to the first front axle as a minimum between the value representative of a maximum permissible ground force on the first front axle of the vehicle in absence of wheel slip present on the first front axle and the value representative of a longitudinal force to be applied to the first front axle of the vehicle to obtain parking, the step of determining being performed by the first data processing module to determine the second braking force distribution value to be applied to the second rear axle as a minimum between the value representative of a maximum permissible ground force on the second rear axle of the vehicle in absence of wheel slip present on the second rear axle and the value representative of a longitudinal force to be applied to the second rear axle of the vehicle to obtain parking.

17. The system according to claim 16, wherein the step of determining the first target braking force to be applied to the first front axle of the vehicle to obtain parking and the second target braking force to be applied to the second rear axle further comprises steps of:
receiving, by the second data processing module of the system, the first information representative of a first working temperature of an electric motor of one or more actuators of at least one first actuator module operatively connected to the first front axle of the vehicle and adapted to implement a braking command based on control received from a respective actuator control module and the second information representative of a second working temperature of an electric motor of one or more actuators of at least one second actuator module operatively connected to the second rear axle of the vehicle and adapted to implement a braking command based on control received from a respective actuator control module;

receiving, by the second data processing module, a first maximum working temperature of an electric motor of one or more actuators of at least one first actuator module operatively connected to the first front axle permissible in absence of damage/reduction of service life and a second maximum working temperature of an electric motor of one or more actuators of at least one second actuator module operatively connected to the second rear axle permissible in absence of damage/reduction of service life;

determining, by the second data processing module, a first maximum force value applicable by a first actuator module adapted to command the first front axle, as a function of the first piece of information representative of a first working temperature of an electric motor of one or more actuators of at least one first actuator module operatively connected to the first front axle of the vehicle and of the first maximum working temperature value of an electric motor of one or more actuators of at least one first actuator module operatively connected to the first front axle permissible in absence of damage/reduction of service life;

determining, by the second data processing module, a second maximum force value applicable by a second actuator module adapted to command the second rear axle, as a function of the second piece of information representative of a second working temperature of an electric motor of one or more actuators of at least one second actuator module operatively connected to the second rear axle of the vehicle and of the second maximum working temperature value of an electric motor of one or more actuators of at least one second actuator module operatively connected to the second rear axle permissible in absence of damage/reduction of service life.

18. The system according to claim 17, wherein the step of determining the first target braking force to be applied to the first front axle of the vehicle to obtain parking and the second target braking force to be applied to the second rear axle further comprises steps of:
receiving from the second data processing module, by the third data processing module of the system, the first braking force distribution value to be applied to the first front axle and the second braking force distribution value be applied to the second rear axle;
receiving from the second data processing module, by the third data processing module, the first maximum force value applicable by the first actuator module adapted to command the first front axle and the second maximum force value applicable from the second actuator module adapted to command the second rear axle; and
determining, by the third data processing module, a first target braking force to be applied to the first front axle of the vehicle to obtain parking and a second target braking force to be applied to the second rear axle of the vehicle to obtain parking, as a function of the first braking force distribution value to be applied to the first front axle, the second braking force distribution value to be applied to the second rear axle, the first maximum force value applicable by the first actuator module adapted to command the first front axle and the second maximum force value applicable by the second actuator module adapted to command the second rear axle.

* * * * *